US012695681B1

(12) United States Patent
       Cruise

(10) Patent No.: US 12,695,681 B1
(45) Date of Patent: **\*Jul. 28, 2026**

(54) SYSTEMS AND METHODS FOR ANALYTICS OF EDGE DEVICE INGESTED DATA

(71) Applicant: SPLUNK INC., San Francisco, CA (US)

(72) Inventor: Alexander William Cruise, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,064

(22) Filed: Apr. 28, 2022

Related U.S. Application Data

(63) Continuation of application No. 16/148,995, filed on Oct. 1, 2018, now Pat. No. 11,469,974, which is a
(Continued)

(51) Int. Cl.
       *H04L 43/028* (2022.01)
       *H04W 4/70* (2018.01)
       *H04W 24/10* (2009.01)

(52) U.S. Cl.
       CPC ............. *H04L 43/028* (2013.01); *H04W 4/70* (2018.02); *H04W 24/10* (2013.01)

(58) Field of Classification Search
       CPC ........ H04L 43/028; H04W 4/70; H04W 24/01
       See application file for complete search history.

(56) References Cited

U.S. PATENT DOCUMENTS 6,154,781 A    11/2000  Bolam et al.
6,243,713 B1    6/2001  Nelson et al.
(Continued)

FOREIGN PATENT DOCUMENTS

CN    106991011 A    7/2017
DE    60002200 T2    4/2004
(Continued)

OTHER PUBLICATIONS

Blesson Varghese, Nan Wang, Dimitrios S. Nikopoulos, Rajkumar Burya, âFeasbility of Fog Computingâ Jan. 19, 2017 https://arxiv.org/pdf/1701.05451 (Year: 2017).*
A. W. Cruise, et. al., "Low-Latency Streaming Analytics," filed Sep. 25, 2017, U.S. Appl. No. 15/715,077 including its prosecution history.
Splunk Enterprise 8.0.0 Overview, available online, retrieved May 20, 2020 from docs.splunk.com.
(Continued)

*Primary Examiner* — Allen S Lin
(74) *Attorney, Agent, or Firm* — Rutan & Tucker, LLP; Kyle M. St. James

(57)                    ABSTRACT

A computerized method is disclosed that includes operations of obtaining ingested data from a plurality of edge devices, performing analyses of the ingested data from each of the plurality of edge devices, wherein the analyses include performing machine learning modeling on the ingested data from each of the plurality of edges to determine predicted values for data expected to be ingested by each of the plurality of edge devices, and based on results generated from performing the machine learning modeling, determining whether predicted values for data expected to be ingested by each of the plurality of edge devices satisfies a predetermined condition for each of the plurality of edge devices. The machine learning modeling may utilize contextual data corresponding to one or more of the plurality of edge devices, wherein contextual data corresponding to a first edge device is data obtained by a device other than the first edge device.

20 Claims, 14 Drawing Sheets

Related U.S. Application Data continuation-in-part of application No. 15/715,077, filed on Sep. 25, 2017, now Pat. No. 10,860,618.

(56) References Cited

U.S. PATENT DOCUMENTS

| | | |
|---|---|---|
| 6,671,795 B1 | 12/2003 | Marr et al. |
| 6,938,147 B1 | 8/2005 | Joy et al. |
| 7,685,281 B1 | 3/2010 | Saraiya et al. |
| 7,702,610 B2 | 4/2010 | Zane et al. |
| 7,788,594 B1 | 8/2010 | Tevanian, Jr. |
| 7,895,359 B2 | 2/2011 | Reed et al. |
| 7,912,839 B1 | 3/2011 | Asher |
| 7,937,344 B2 | 5/2011 | Baum et al. |
| 8,065,319 B2 | 11/2011 | Ding et al. |
| 8,112,425 B2 | 2/2012 | Baum et al. |
| 8,374,986 B2 | 2/2013 | Indeck et al. |
| 8,412,696 B2 | 4/2013 | Zhang et al. |
| 8,504,565 B2 | 8/2013 | Pitts |
| 8,504,620 B2 | 8/2013 | Chi et al. |
| 8,589,375 B2 | 11/2013 | Zhang et al. |
| 8,589,403 B2 | 11/2013 | Marquardt et al. |
| 8,589,432 B2 | 11/2013 | Zhang et al. |
| 8,612,440 B2 | 12/2013 | Thang |
| 8,667,456 B1 | 3/2014 | Czymontek |
| 8,682,925 B1 | 3/2014 | Marquardt et al. |
| 8,738,587 B1 | 5/2014 | Bitincka et al. |
| 8,738,629 B1 | 5/2014 | Bitincka et al. |
| 8,751,529 B2 | 6/2014 | Zhang et al. |
| 8,788,525 B2 | 7/2014 | Neels et al. |
| 8,788,526 B2 | 7/2014 | Neels et al. |
| 8,793,225 B1 | 7/2014 | Bitincka et al. |
| 8,826,434 B2 | 9/2014 | Merza |
| 8,924,476 B1 | 12/2014 | Granström et al. |
| 8,983,994 B2 | 3/2015 | Neels et al. |
| 9,026,903 B1 | 5/2015 | Michael et al. |
| 9,124,612 B2 | 9/2015 | Vasan et al. |
| 9,128,980 B2 | 9/2015 | Neels et al. |
| 9,128,985 B2 | 9/2015 | Marquardt et al. |
| 9,130,971 B2 | 9/2015 | Vasan et al. |
| 9,173,801 B2 | 11/2015 | Merza |
| 9,185,007 B2 | 11/2015 | Fletcher et al. |
| 9,215,240 B2 | 12/2015 | Merza et al. |
| 9,248,068 B2 | 2/2016 | Merza |
| 9,286,413 B1 | 3/2016 | Coates et al. |
| 9,336,143 B1 | 5/2016 | Wallace et al. |
| 9,348,602 B1 | 5/2016 | Alapati et al. |
| 9,367,501 B2 | 6/2016 | Idziorek et al. |
| 9,426,045 B2 | 8/2016 | Fletcher et al. |
| 9,426,172 B2 | 8/2016 | Merza |
| 9,432,396 B2 | 8/2016 | Merza |
| 9,514,189 B2 | 12/2016 | Bitincka et al. |
| 9,537,692 B2 | 1/2017 | Kresse et al. |
| 9,589,012 B2 | 3/2017 | Neels et al. |
| 9,838,292 B2 | 12/2017 | Polychronis |
| 9,892,020 B1 | 2/2018 | Ophir et al. |
| 9,928,379 B1 | 3/2018 | Hoffer |
| 9,990,386 B2 | 6/2018 | Marquardt et al. |
| 10,049,160 B2 | 8/2018 | Bitincka et al. |
| 10,127,258 B2 | 11/2018 | Lamas et al. |
| 10,193,822 B1 | 1/2019 | Bacus et al. |
| 10,223,176 B1 | 3/2019 | Chen et al. |
| 10,310,966 B1 | 6/2019 | Ge et al. |
| 10,360,196 B2 | 7/2019 | Hsiao et al. |
| 10,437,653 B2 | 10/2019 | Cyr et al. |
| 10,574,548 B2 | 2/2020 | Coates et al. |
| 10,614,132 B2 | 4/2020 | Bingham et al. |
| 10,691,523 B2 | 6/2020 | Noel et al. |
| 10,749,782 B2 | 8/2020 | Turgut et al. |
| 10,761,813 B1 | 9/2020 | Echeverria et al. |
| 10,775,976 B1 | 9/2020 | Abdul-Jawad et al. |
| 10,776,355 B1 | 9/2020 | Batsakis et al. |
| 10,776,441 B1 | 9/2020 | Echeverria et al. |
| 10,853,186 B1 | 12/2020 | Kumar |
| 10,860,618 B2 | 12/2020 | Cruise et al. |
| 10,880,366 B1 | 12/2020 | Chen et al. |
| 10,884,828 B2 | 1/2021 | Deligia et al. |
| 10,885,021 B1 | 1/2021 | Llorca et al. |
| 10,936,585 B1 | 3/2021 | Echeverria et al. |
| 10,936,643 B1 | 3/2021 | Alspaugh et al. |
| 10,984,044 B1 | 4/2021 | Batsakis et al. |
| 10,997,180 B2 | 5/2021 | James et al. |
| 10,997,217 B1 | 5/2021 | Nielsen et al. |
| 11,003,714 B1 | 5/2021 | Batsakis et al. |
| 11,048,699 B1 | 6/2021 | Grider et al. |
| 11,055,135 B2 | 7/2021 | Popovic et al. |
| 11,074,107 B1 | 7/2021 | Nandakumar |
| 11,106,734 B1 | 8/2021 | Batsakis et al. |
| 11,113,353 B1 | 9/2021 | Echeverria et al. |
| 11,194,552 B1 | 12/2021 | Echeverria et al. |
| 11,226,885 B1 | 1/2022 | Gasser et al. |
| 11,238,048 B1 | 2/2022 | Breeden et al. |
| 11,243,704 B2 | 2/2022 | Das et al. |
| 11,269,939 B1 | 3/2022 | Sammer et al. |
| 11,294,941 B1 | 4/2022 | Sammer et al. |
| 11,341,257 B1 | 5/2022 | Cohen et al. |
| 11,347,747 B1 | 5/2022 | Paduroiu |
| 11,386,127 B1 | 7/2022 | Cruise et al. |
| 11,474,673 B1 | 10/2022 | Abdul-Jawad et al. |
| 11,614,923 B2 | 3/2023 | Burnett et al. |
| 11,615,084 B1 | 3/2023 | Echeverria et al. |
| 11,636,116 B2 | 4/2023 | Kulkarni et al. |
| 11,645,286 B2 | 5/2023 | James et al. |
| 11,650,995 B2 | 5/2023 | Kulkarni et al. |
| 11,663,219 B1 | 5/2023 | Profirovic et al. |
| 11,687,487 B1 | 6/2023 | Abdul-Jawad et al. |
| 11,727,039 B2 | 8/2023 | Cruise et al. |
| 11,886,440 B1 | 1/2024 | Breeden et al. |
| 11,989,592 B1 | 5/2024 | Kulkarni et al. |
| 12,013,852 B1 | 6/2024 | Echeverria et al. |
| 12,105,740 B2 | 10/2024 | Cruise et al. |
| 2002/0040304 A1 | 4/2002 | Shenoy et al. |
| 2002/0070968 A1 | 6/2002 | Austin et al. |
| 2003/0130993 A1 | 7/2003 | Mendelevitch et al. |
| 2003/0217119 A1 | 11/2003 | Raman et al. |
| 2004/0015344 A1 | 1/2004 | Shimomura et al. |
| 2004/0017395 A1 | 1/2004 | Cook |
| 2004/0054876 A1 | 3/2004 | Grisenthwaite et al. |
| 2004/0064818 A1 | 4/2004 | Alverson et al. |
| 2004/0225865 A1 | 11/2004 | Cox et al. |
| 2004/0230571 A1 | 11/2004 | Robertson |
| 2005/0022207 A1 | 1/2005 | Grabarnik et al. |
| 2005/0076067 A1 | 4/2005 | Bakalash et al. |
| 2006/0069717 A1 | 3/2006 | Mamou et al. |
| 2007/0106951 A1 | 5/2007 | McCormack et al. |
| 2007/0162490 A1 | 7/2007 | Rubio et al. |
| 2007/0168336 A1 | 7/2007 | Ransil et al. |
| 2007/0198641 A1 | 8/2007 | Dorai et al. |
| 2008/0010337 A1 | 1/2008 | Hayes et al. |
| 2008/0021872 A1 | 1/2008 | Borrillo et al. |
| 2008/0120322 A1 | 5/2008 | Liu et al. |
| 2008/0189332 A1 | 8/2008 | Winter |
| 2008/0310267 A1 | 12/2008 | Hattori et al. |
| 2009/0196186 A1 | 8/2009 | Lidstrom et al. |
| 2010/0250504 A1 | 9/2010 | Balasubramanian et al. |
| 2010/0318532 A1 | 12/2010 | Sznajder et al. |
| 2011/0173184 A1 | 7/2011 | Kelshikar et al. |
| 2011/0173200 A1 | 7/2011 | Yang et al. |
| 2011/0320391 A1 | 12/2011 | Chen et al. |
| 2011/0320550 A1 | 12/2011 | Lawson et al. |
| 2012/0079004 A1 | 3/2012 | Herman |
| 2012/0089612 A1 | 4/2012 | Collins et al. |
| 2012/0123994 A1 | 5/2012 | Lowry et al. |
| 2012/0197934 A1 | 8/2012 | Zhang et al. |
| 2012/0284331 A1 | 11/2012 | Kambatla et al. |
| 2012/0284713 A1 | 11/2012 | Ostermeyer et al. |
| 2013/0066674 A1 | 3/2013 | Vasters |
| 2013/0160026 A1 | 6/2013 | Kuesel et al. |
| 2013/0166965 A1 | 6/2013 | Brochu et al. |
| 2013/0317919 A1 | 11/2013 | Raman et al. |
| 2013/0318236 A1 | 11/2013 | Coates et al. |
| 2013/0325916 A1 | 12/2013 | Pitts |
| 2014/0149725 A1 | 5/2014 | Gherman et al. |
| 2014/0181679 A1 | 6/2014 | Sarangi et al. |
| 2014/0297260 A1 | 10/2014 | Allen |

(56) References Cited

U.S. PATENT DOCUMENTS

| | | | |
|---|---|---|---|
| 2014/0324862 A1 | 10/2014 | Bingham et al. | |
| 2014/0359569 A1 | 12/2014 | Avadhanula et al. | |
| 2015/0019537 A1 | 1/2015 | Robichaud et al. | |
| 2015/0032775 A1 | 1/2015 | Yang et al. | |
| 2015/0149507 A1 | 5/2015 | Imaki et al. | |
| 2015/0169714 A1 | 6/2015 | Imai et al. | |
| 2015/0207857 A1 | 7/2015 | Horton | |
| 2015/0213631 A1 | 7/2015 | Vander Broek | |
| 2015/0304879 A1 | 10/2015 | Dacosta | |
| 2015/0317572 A1 | 11/2015 | Balasubramanian | |
| 2015/0331910 A1 | 11/2015 | Srinivasan et al. | |
| 2015/0332481 A1 | 11/2015 | Rosasco | |
| 2015/0341739 A1* | 11/2015 | Jin | H04L 43/16 |
| | | | 370/254 |
| 2015/0379672 A1 | 12/2015 | Wang | |
| 2016/0048408 A1 | 2/2016 | Madhu et al. | |
| 2016/0050261 A1 | 2/2016 | Mcdaid et al. | |
| 2016/0062736 A1 | 3/2016 | Stanfill et al. | |
| 2016/0078455 A1 | 3/2016 | O'Donnell et al. | |
| 2016/0085810 A1 | 3/2016 | De Castro Alves et al. | |
| 2016/0098432 A1 | 4/2016 | Madany et al. | |
| 2016/0103659 A1 | 4/2016 | Tijanic et al. | |
| 2016/0117158 A1 | 4/2016 | Maccleery et al. | |
| 2016/0140205 A1 | 5/2016 | Hsu et al. | |
| 2016/0140596 A1 | 5/2016 | Green et al. | |
| 2016/0170994 A1 | 6/2016 | Soderberg et al. | |
| 2016/0179884 A1 | 6/2016 | Jerzak et al. | |
| 2016/0203135 A1 | 7/2016 | Bhattacharjee et al. | |
| 2016/0212099 A1 | 7/2016 | Zou et al. | |
| 2016/0224459 A1 | 8/2016 | Liu et al. | |
| 2016/0246834 A1 | 8/2016 | Regni et al. | |
| 2016/0268013 A1 | 9/2016 | Markovich et al. | |
| 2016/0286013 A1 | 9/2016 | Yu et al. | |
| 2016/0291942 A1 | 10/2016 | Hutchison | |
| 2016/0321109 A1 | 11/2016 | He et al. | |
| 2016/0342454 A1 | 11/2016 | Noel et al. | |
| 2016/0364093 A1 | 12/2016 | Denton et al. | |
| 2017/0006135 A1 | 1/2017 | Siebel et al. | |
| 2017/0012909 A1 | 1/2017 | Lieu | |
| 2017/0024912 A1 | 1/2017 | De Castro Alves et al. | |
| 2017/0046374 A1 | 2/2017 | Fletcher et al. | |
| 2017/0083588 A1 | 3/2017 | Lang et al. | |
| 2017/0103103 A1 | 4/2017 | Nixon et al. | |
| 2017/0104819 A1 | 4/2017 | Anastasi et al. | |
| 2017/0109378 A1 | 4/2017 | Brewster et al. | |
| 2017/0124166 A1 | 5/2017 | Thomas et al. | |
| 2017/0180289 A1 | 6/2017 | Chiappone et al. | |
| 2017/0199809 A1 | 7/2017 | Michelsen | |
| 2017/0214573 A1* | 7/2017 | Linsky | H04W 48/16 |
| 2017/0220685 A1 | 8/2017 | Yan et al. | |
| 2017/0243132 A1 | 8/2017 | Sainani et al. | |
| 2017/0265020 A1 | 9/2017 | Dewangan et al. | |
| 2017/0351585 A1 | 12/2017 | Bourbonnais et al. | |
| 2017/0372016 A1 | 12/2017 | Jiang | |
| 2018/0011655 A1 | 1/2018 | Gredler et al. | |
| 2018/0032908 A1 | 2/2018 | Nagaraju et al. | |
| 2018/0034715 A1 | 2/2018 | Nagaraju et al. | |
| 2018/0041525 A1 | 2/2018 | Elgressy et al. | |
| 2018/0074752 A1 | 3/2018 | Nakazono et al. | |
| 2018/0074870 A1 | 3/2018 | Park et al. | |
| 2018/0089287 A1 | 3/2018 | Haggie et al. | |
| 2018/0089324 A1 | 3/2018 | Pal et al. | |
| 2018/0113783 A1 | 4/2018 | Luo et al. | |
| 2018/0121963 A1* | 5/2018 | Hwang | A63F 13/61 |
| 2018/0189642 A1 | 7/2018 | Boesch et al. | |
| 2018/0210955 A1 | 7/2018 | Crabtree et al. | |
| 2018/0246983 A1 | 8/2018 | Rathod | |
| 2018/0262592 A1 | 9/2018 | Zandi et al. | |
| 2018/0284975 A1 | 10/2018 | Carrier et al. | |
| 2018/0310889 A1* | 11/2018 | Ten Kate | A61B 5/1118 |
| 2018/0329644 A1 | 11/2018 | Das et al. | |
| 2018/0332367 A1 | 11/2018 | Kaitchuck et al. | |
| 2018/0341992 A1* | 11/2018 | Bostick | G06Q 30/0282 |
| 2018/0376416 A1* | 12/2018 | Khanna | H04W 84/18 |
| 2019/0034813 A1 | 1/2019 | Das et al. | |
| 2019/0065248 A1 | 2/2019 | Ravindran et al. | |
| 2019/0081759 A1 | 3/2019 | Wang et al. | |
| 2019/0095510 A1 | 3/2019 | Cruise et al. | |
| 2019/0098106 A1 | 3/2019 | Mungel et al. | |
| 2019/0109848 A1 | 4/2019 | Clark et al. | |
| 2019/0146960 A1 | 5/2019 | Beedgen et al. | |
| 2019/0155802 A1 | 5/2019 | Miller et al. | |
| 2019/0213552 A1 | 7/2019 | Gupta et al. | |
| 2019/0230153 A1 | 7/2019 | Mcphee et al. | |
| 2019/0243683 A1 | 8/2019 | Botelho | |
| 2019/0349426 A1 | 11/2019 | Smith et al. | |
| 2019/0355022 A1 | 11/2019 | Hertel et al. | |
| 2019/0361688 A1 | 11/2019 | Chigakkagari et al. | |
| 2019/0377816 A1 | 12/2019 | Mccluskey et al. | |
| 2019/0379650 A1 | 12/2019 | Hale et al. | |
| 2019/0384659 A1 | 12/2019 | Johannsen et al. | |
| 2019/0384836 A1 | 12/2019 | Roth et al. | |
| 2020/0012935 A1 | 1/2020 | Goodsitt et al. | |
| 2020/0019638 A1 | 1/2020 | Dilova et al. | |
| 2020/0034468 A1 | 1/2020 | Lei et al. | |
| 2020/0050612 A1 | 2/2020 | Bhattacharjee et al. | |
| 2020/0089529 A1 | 3/2020 | Brownsword et al. | |
| 2020/0104401 A1 | 4/2020 | Burnett et al. | |
| 2020/0142810 A1 | 5/2020 | Zingade et al. | |
| 2020/0175040 A1 | 6/2020 | Faltz et al. | |
| 2020/0225655 A1 | 7/2020 | Cella et al. | |
| 2020/0265057 A1 | 8/2020 | Jolfaei | |
| 2020/0274915 A1 | 8/2020 | Ramon | |
| 2020/0293835 A1 | 9/2020 | Doni et al. | |
| 2020/0356676 A1 | 11/2020 | Gorlamandala | |
| 2020/0379892 A1 | 12/2020 | Velipasaoglu et al. | |
| 2020/0389690 A1 | 12/2020 | Morris | |
| 2021/0034615 A1 | 2/2021 | Chen et al. | |
| 2021/0117857 A1 | 4/2021 | Sriharsha | |
| 2021/0117868 A1 | 4/2021 | Sriharsha | |
| 2021/0173670 A1 | 6/2021 | Borra et al. | |
| 2021/0191793 A1 | 6/2021 | Mccrary | |
| 2021/0200533 A1 | 7/2021 | Gage et al. | |
| 2021/0224178 A1 | 7/2021 | Singh et al. | |
| 2021/0232579 A1 | 7/2021 | Schechter et al. | |
| 2021/0240519 A1 | 8/2021 | Gitelman et al. | |
| 2021/0303584 A1 | 9/2021 | Fan et al. | |
| 2021/0342125 A1 | 11/2021 | Burnett et al. | |
| 2021/0365477 A1 | 11/2021 | Pippin et al. | |
| 2021/0397465 A1 | 12/2021 | Mellquist et al. | |
| 2022/0004557 A1 | 1/2022 | James et al. | |
| 2022/0121477 A1 | 4/2022 | Chivukula et al. | |
| 2022/0150514 A1 | 5/2022 | Miller | |
| 2022/0245115 A1 | 8/2022 | Kulkarni et al. | |
| 2022/0245156 A1 | 8/2022 | Kulkarni et al. | |
| 2022/0247695 A1 | 8/2022 | Kulkarni et al. | |
| 2023/0015926 A1 | 1/2023 | Cruise et al. | |
| 2023/0244673 A1 | 8/2023 | James et al. | |
| 2023/0342380 A1 | 10/2023 | Cruise et al. | |
| 2023/0385288 A1 | 11/2023 | Kulkarni et al. | |

FOREIGN PATENT DOCUMENTS

| | | |
|---|---|---|
| WO | 2019195969 A1 | 10/2019 |
| WO | 2021222395 A1 | 11/2021 |
| WO | 2022164925 A1 | 8/2022 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(56)　　　　　References Cited

OTHER PUBLICATIONS

A. W. Cruise, et. al. "System and Method for Centralized Analytics for Edge Devices With Enrichment Pushdown," filed Jan. 31, 2019, U.S. Appl. No. 16/264,526 including its prosecution history.

A. W. Cruise, et al. "System and Method for Centralized Analytics for Edge Devices With Enrichment Pushdown," filed Jan. 13, 2020, U.S. Appl. No. 17/148,478 including its prosecution history.

Abdul-Jawad B., et al., "Visual Previews for Programming an Iterative Publish-Subscribe Message Processing System," U.S. Appl. No. 16/148,703, filed Oct. 1, 2018, 292 Pages.

Abdul-Jawad, et al., U.S. Appl. No. 16/945,657, filed Jul. 31, 2020, 227 Pages.

Abdul-Jawad, et al., U.S. Appl. No. 17/199,318, filed Mar. 11, 2021, 199 Pages.

Atkinson C., et al., "Harmonizing Textual and Graphical Visualizations of Domain Specific Models," ACM, 2013, pp. 32-41, Retrieved from URL: http://www.dsmforum.org/events/gmid13/papers/p32_atkinson.pdf.

Bakliwal S., "A Comprehensive Guide to Apache Flink Ecosystem Components," Linkedin, Feb. 18, 2017, 7 Pages, Retrieved from URL: https://www.linkedin.com/pulse/comprehensive-guide-apache-flink-ecosystem-components-bakliwal/.

Breeden J., et al., U.S. Appl. No. 17/589,441, filed Jan. 31, 2022, 108 Pages.

Cannon, et al., U.S. Appl. No. 17/444,157, filed Jul. 30, 2021, 319 Pages.

Cannon F., et al., "Updating Query and Action Panels Based on Interaction With Query Results," U.S. Appl. No. 17/444,152, filed Jul. 30, 2021, 98 Pages.

Co-Pending U.S. Appl. No. 18/656,424, filed May 6, 2024, 234 Pages.

Co-Pending U.S. Appl. No. 18/190,815, filed Mar. 27, 2023, 308 Pages.

Co-Pending U.S. Appl. No. 18/192,136, filed Mar. 29, 2023, 142 Pages.

Cruise A.W., et al., U.S. Appl. No. 17/811,849, filed Jul. 11, 2022, 145 Pages.

Cruise A.W., et al., U.S. Appl. No. 18/343,420, filed Jun. 28, 2023, 147 Pages.

Daxini M., "NETFLIX Keystone SPaaS: Real-time Stream Processing as a Service—ABD320—Reinvent 2017," Clip Slide, Slideshare, Dec. 14, 2017, 46 Pages, Retrieved from URL: https://www.slideshare.net/AmazonWebServices/netflix-keystone-spaas-realtime-stream-processing-as-a-service-abd320-reinvent-2017.

Echeverria J.B., et al., U.S. Appl. No. 17/175,518, filed Feb. 12, 2021, 307 Pages.

Echeverria J.G., et al., "Assisted Visual Programming for Iterative Publish-Subscribe Message Processing System," U.S. Appl. No. 16/148,736, filed Oct. 1, 2018, 292 Pages.

Echeverria J.G., et al., "Unified Data Processing Across Streaming and Indexed Data Sets," U.S. Appl. No. 16/177,234, filed Oct. 31, 2018, 309 Pages.

Echeverria J.G., et al., "Visual Programming for Iterative Publish-Subscribe Message Processing System," U.S. Appl. No. 16/148,840, filed Oct. 1, 2018, 293 Pages.

Hayden C.M., et al., "Kitsune: Efficient, General-purpose Dynamic Software Updating for C," ACM Transactions on Programming Languages and Systems, Proceedings of the ACM International Conference on Object Oriented Programming Systems Languages and Applications, Oct. 2014, vol. 36, No. 4, Article No. 13, pp. 13-13:38 (38 Pages), (2012).

International Preliminary Report on Patentability for International Application No. PCT/US2021/029623, dated Oct. 27, 2022, 08 Pages.

International Preliminary Report on Patentability for International Application No. PCT/US2022/013937, dated Mar. 20, 2023, 17 Pages.

International Search Report and Written Opinion for International Application No. PCT/US2021/029623, dated Jul. 8, 2021, 18 Pages.

International Search Report and Written Opinion for International Application No. PCT/US2022/013937, dated Apr. 19, 2022, 17 Pages.

James, et al., U.S. Appl. No. 17/236,925, filed Apr. 21, 2021, 108 Pages.

Kulkarni, et al., U.S. Appl. No. 18/304,770, filed Apr. 21, 2023, 209 Pages.

Kulkarni S., U.S. Appl. No. 17/444, 170, filed Jul. 30, 2021, 325 Pages.

Kulkarni S., U.S. Appl. No. 17/444,172, filed Jul. 30, 2021, 326 Pages.

Lopes G., et al., "Bonsai: An Event-based Framework for Processing and Controlling Data Streams," Frontiers in Neuroinformatics [Online], Apr. 8, 2015, vol. 9, Article No. 7, pp. 1-14, XP055819723, [Retrieved on Jun. 30, 2021], Retrieved from URL: https://www.fronteirsin.org/articles/10.3389/fninf.2015.00007/full.

Ma L., et al., Co-Pending U.S. Appl. No. 17/476,323, filed Sep. 15, 2021, 170 Pages.

Mahapatra T., "High-Level Graphical Programming for Big Data Applications," TUM, Faculty of Computer Science, 2019, pp. 1-195 (215 Pages), Retrieved from URL: http://mediatum.ub.tum.de/doc/1524977/41093.pdf.

Makris K., et al., "Immediate Multi-Threaded Dynamic Software Updates Using Stack Reconstruction," USENIX Annual Technical Conference, 2009, 14 Pages.

Metzger R., "Kafka + Flink: A Practical, How-To Guide," Ververica, Sep. 2, 2015, 13 Pages, Retrieved from URL: https://www.ververica.com/blog/kafka-flink-a-practical-how-to.

Myers W., "Skating Out the Graphics Display Pipeline," IEEE Computer Graphics & Applications, Jul. 1984, vol. 4, No. 7, pp. 60-65.

Netflix Technology Blog; "Keystone Real-time Stream Processing Platform," Netflix Tech Blog, Sep. 10, 2018, 18 Pages, [Retrieved on Apr. 9, 2020] Retrieved from URL: https://netflixtechblog.com/keystone-real-time-stream-processing-platform-a3ee651812agi=71cc12ef6b89.

Profirovic D., et al., U.S. Appl. No. 17/239,384, filed Apr. 23, 2021, 252 Pages.

Sammer E., et al., "Iterative Message-Based Data Processing Including Streaming Analytics," U.S. Appl. No. 15/967,581, filed Apr. 30, 2018, 278 Pages.

Sammer E., et al., "Message-Based Data Ingestion to a Data Intake and Query System," U.S. Appl. No. 16/000,688, filed Jun. 5, 2018, 242 Pages.

Streamsets Docs: "Databricks Query," Apr. 28, 2020, 7 Pages, XP055819677, [Retrieved on Jun. 29, 2021], Retrieved from URL: https://docs.streamsets.eom/portal/#controlhub/3.15.x/onpremhelp/datacollector/UserGuide/Executors/DatabricksQueryu.html#conceptbzl3fqzjbj.

Streamsets Docs: "Dataflow Triggers," Apr. 28, 2020, 19 Pages, XP055819664, [Retrieved on Jun. 29, 2021], Retrieved from URL: https://docs.streamsets.com/portal/#controlhum/3.15.x/onpremhelp/datacollector/UserGuide/EventHandling/EventFramework-Title.html#conceptxxdf5rkxs.

Streamsets Docs: "Destinations," Apr. 28, 2020, 04 Pages, XP055819673, [Retrieved on Jun. 30, 2021] Retrieved from URL: https://docs.streamsets.com/portal/#controlhub/3.15.x/onpremhelp/datacollector/UserGuide/Destinations/Destinations_overview.html#concepthprtwm_jp.

Streamsets Docs: "Google Pub/Sub Publisher," Apr. 28, 2020, 8 Pages, XP055819675, [Retrieved on Jun. 30, 2021] Retrieved from URL: https://docs.streamsets.com/portal/#controlhub/3.15.x/onpremhelp/datacollector/UserGuide/Destinations/PubSubPublisher.html#conceptqsjhklv1b.

Streamsets Docs: "Simple and Bulk Edid Mode," Apr. 28, 2020, 1 Page, XP055819681, [Retrieved on Jun. 29, 2021] Retrieved from URL: https://docs.streamsets.eom/portal/#controlhub/3.15.x/onpremhelp/datacollector/UserGuide/PipelineConfiguarion/SimpleBulkEdit.htmlhl=bulk%2Cedit%2Cmode.

Streamsets Docs: "Pipeline Designer UI," Apr. 28, 2020, 3 Pages, [Retrieved on Jun. 29, 2021], Retrieved from URL: https://docs.streamsets.com/portal/#controlhub/3.15.x/onpremhelp/datacollector/UserGuide/PipelineConfiguaration/PipelineDesignerUI.html.

(56)          References Cited

OTHER PUBLICATIONS

Streamsets: "StreamSets Data Collector Cumulative 3.15.x Release Notes," Apr. 16, 2020, 04 Pages, Document Revised on Apr. 28, 2020, XP055819684, [Retrieved on Jun. 30, 2021], Retrieved from URL: https://docs.streamsets.com/datacollector/3.15.x/releasenotes/SDC_RN_3.15.x.pdf.

Vaid K., "QPS, KW-hr, MTBF, DeltaT, PUE, IOPS, DB/RH: A Day in the Life of a Datacenter Architect," Workshop on Managing Systems via Log Analysis and Machine Learning Techniques, (SLAML '10) , Vancouver, BC, Canada, Conference Reports, vol. 36, No. 1, Feb. 2011, pp. 104-110 (7 Pages), (Oct. 3, 2010).

Wiener P., et al., "Industry Paper: Managing Geo-Distributed Stream Processing Pipelines for the IIoT with StreamPipes Edge Extensions," 14th ACM International Conference on Distributed and Event-based Systems (DEBS '20), Virtual Event, QC Canada ACM, New York, NY, USA, Jul. 13-17, 2020, pp. 165-176 (12 Pages).

Written Opinion of the International Preliminary Examining Authority for International Application No. PCT/US2022/013937, dated Jan. 3, 2023, 8 Pages.

Wu S., "Building Stream Processing as a Service (SPaaS)," Oreillystatic, Netflix Presentation, Dec. 2017, 113 Pages, Retrieved from URL: https://cdn.oreillystatic.com/en/assets/1/event/281/Building%20stream%20processing%20as%20a%20service%20at%20Netilix%20Presentation.pdf.

Zhang J., et al., "Coupling Browse and Search in Highly Interactive User Interfaces: A Study of the Relation Browser++," University of North Carolina-Chapel Hill, Edu, 2004, 09 Pages.

* cited by examiner

PROCESS
400

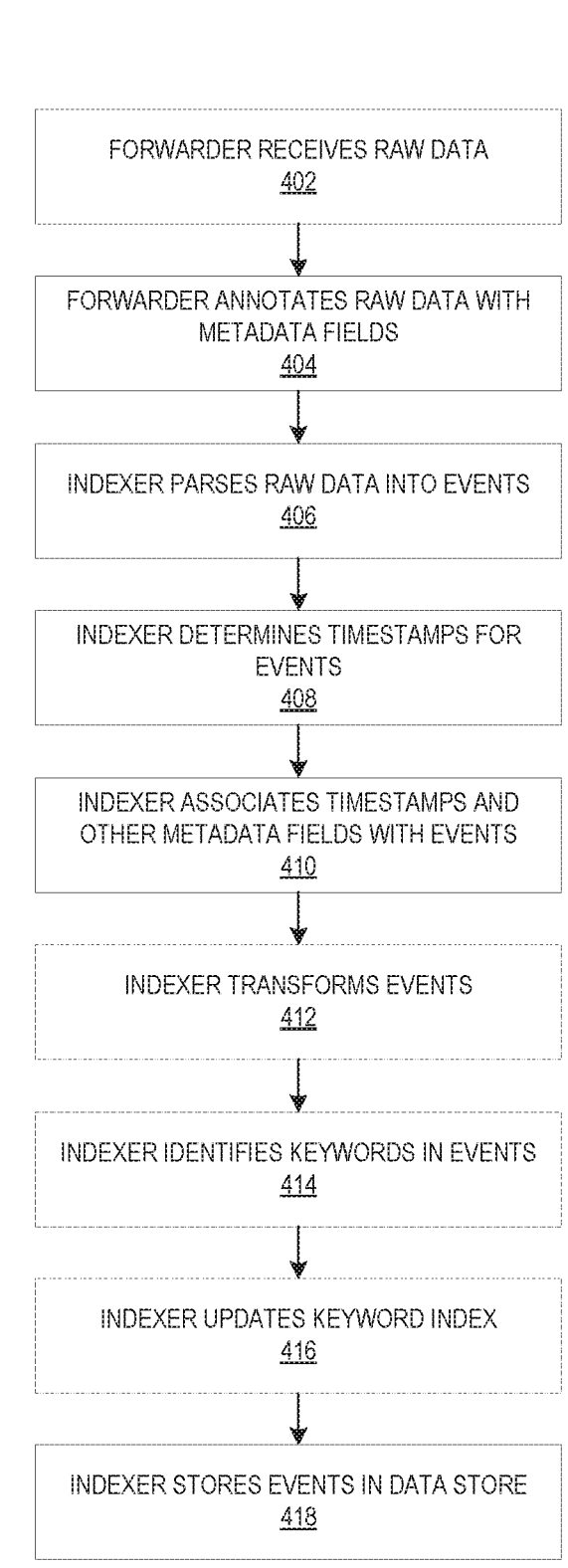

FORWARDER RECEIVES RAW DATA
402

FORWARDER ANNOTATES RAW DATA WITH
METADATA FIELDS
404

INDEXER PARSES RAW DATA INTO EVENTS
406

INDEXER DETERMINES TIMESTAMPS FOR
EVENTS
408

INDEXER ASSOCIATES TIMESTAMPS AND
OTHER METADATA FIELDS WITH EVENTS
410

INDEXER TRANSFORMS EVENTS
412

INDEXER IDENTIFIES KEYWORDS IN EVENTS
414

INDEXER UPDATES KEYWORD INDEX
416

INDEXER STORES EVENTS IN DATA STORE
418

FIG. 4

PROCESS
500

SEARCH HEAD RECEIVES QUERY FROM A
DEVICE
502

SEARCH HEAD DETERMINES WHAT PORTIONS
OF THE QUERY CAN BE DISTRIBUTED TO
INDEXERS
504

SEARCH HEAD DISTRIBUTES PORTIONS OF
QUERY TO INDEXERS
506

INDEXERS SEARCH DATA STORE FOR QUERY-
RESPONSIVE EVENTS
508

SEARCH HEAD COMBINES ANY PARTIAL
RESULTS OR EVENTS TO PRODUCE FINAL
RESULT
510

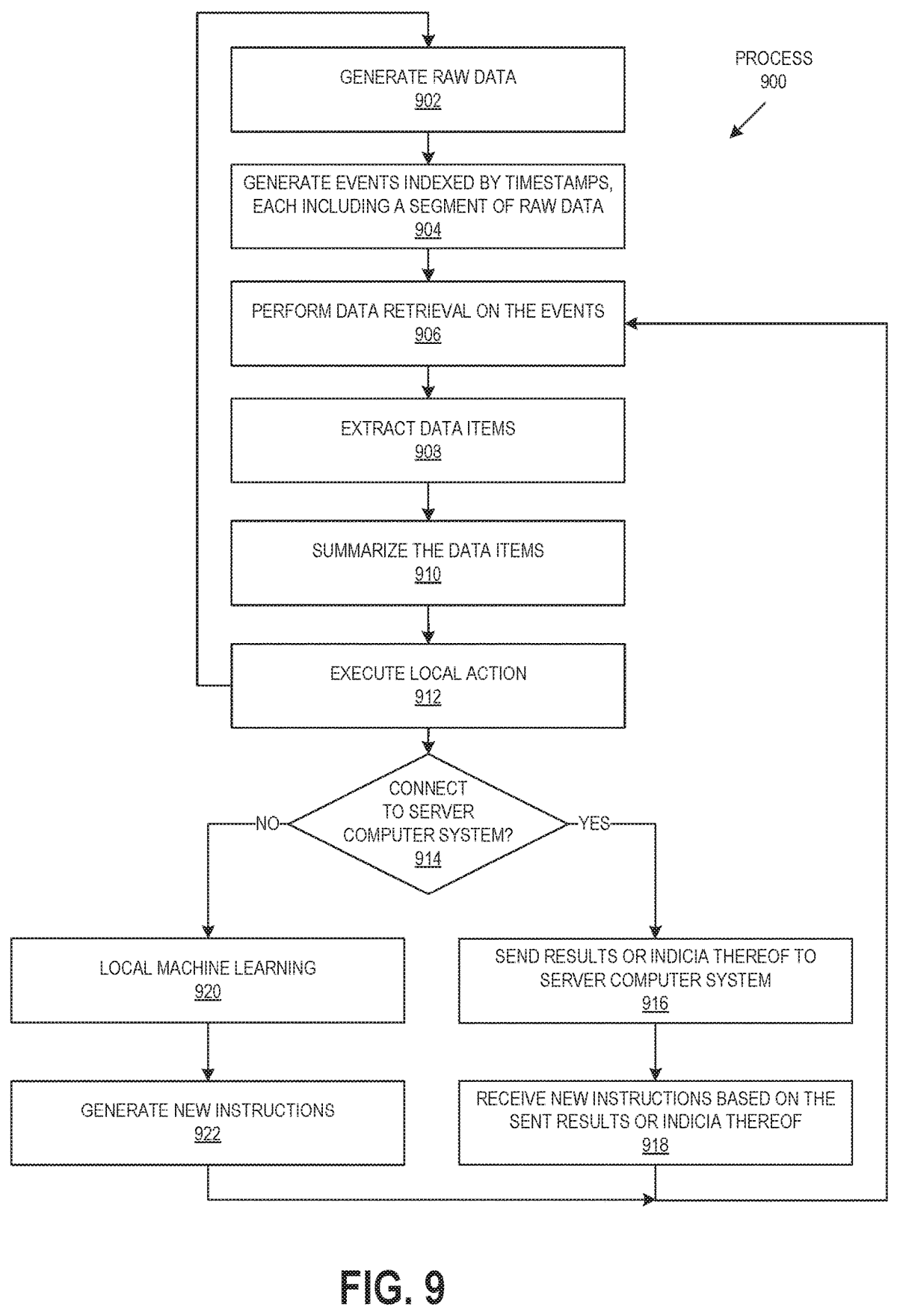

PROCESS
900

GENERATE RAW DATA
902

GENERATE EVENTS INDEXED BY TIMESTAMPS,
EACH INCLUDING A SEGMENT OF RAW DATA
904

PERFORM DATA RETRIEVAL ON THE EVENTS
906

EXTRACT DATA ITEMS
908

SUMMARIZE THE DATA ITEMS
910

EXECUTE LOCAL ACTION
912

CONNECT
TO SERVER
COMPUTER SYSTEM?
914

NO

YES

LOCAL MACHINE LEARNING
920

SEND RESULTS OR INDICIA THEREOF TO
SERVER COMPUTER SYSTEM
916

GENERATE NEW INSTRUCTIONS
922

RECEIVE NEW INSTRUCTIONS BASED ON THE
SENT RESULTS OR INDICIA THEREOF
918

FIG. 9

PROCESS
1000

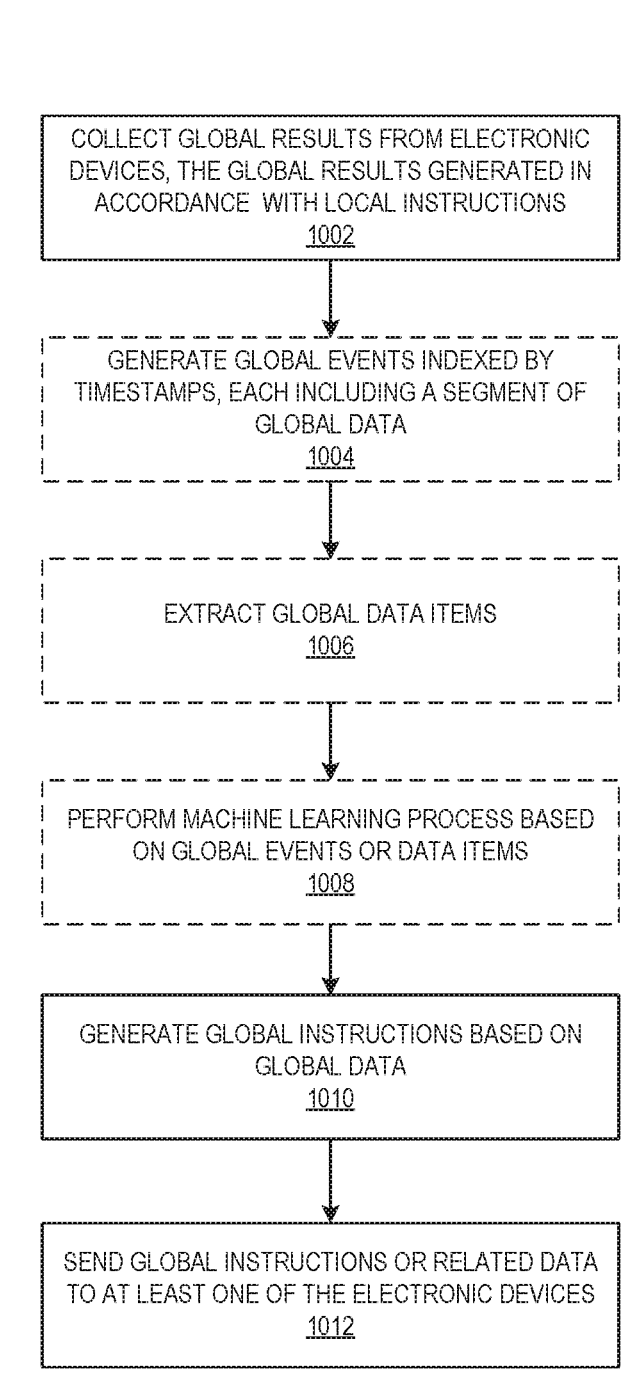

COLLECT GLOBAL RESULTS FROM ELECTRONIC
DEVICES, THE GLOBAL RESULTS GENERATED IN
ACCORDANCE WITH LOCAL INSTRUCTIONS
1002

GENERATE GLOBAL EVENTS INDEXED BY
TIMESTAMPS, EACH INCLUDING A SEGMENT OF
GLOBAL DATA
1004

EXTRACT GLOBAL DATA ITEMS
1006

PERFORM MACHINE LEARNING PROCESS BASED
ON GLOBAL EVENTS OR DATA ITEMS
1008

GENERATE GLOBAL INSTRUCTIONS BASED ON
GLOBAL DATA
1010

SEND GLOBAL INSTRUCTIONS OR RELATED DATA
TO AT LEAST ONE OF THE ELECTRONIC DEVICES
1012

FIG. 10

1200

SERVER COMPUTER SYSTEM *14*

36 — DATA STORE ⟷ 38 SEARCH HEAD ⟷ 20 INSTRUCTION ALGORTIGHMS

34 — INDEXER

62 — HOST APPLICATIONS

22 — GLOBAL INSTRUCTIONS

MQTT/HTTP EVENT COLLECTOR

RULE SET COMMUNICATIONS

SPL QUERY & MODEL DATA

FILTER *56*    TRANSFORMS *58*    RULES *60*

FORWARDER *30*

EDGE DEVICE *12*

CONFIGURATION MANAGER *54*

MEMORY *52*

CLIENT APPLICATIONS *42*

DATA ENRICHMENT APPLICATIONS *50*

1202 — RULE SET STORAGE

48 —

MACHINE LEARNING APPLICATIONS

LOCAL INSTRUCTIONS *18*

SPLUNK APPLICATIONS *46*

SPLUNKD DAEMON *44*

1204₁ — RULE SET ••• RULE SET

1204ᵢ

SENSORS (E.G., DATA ACQUISITION CIRCUITRY) *40*

*FIG. 12*

SYSTEMS AND METHODS FOR ANALYTICS OF EDGE DEVICE INGESTED DATA

CROSS-REFERENCE TO RELATED APPLICATIONS

This patent application claims priority to and is a continuation of U.S. patent application Ser. No. 16/148,995 titled "ANALYTICS FOR EDGE DEVICES TO INTELLIGENTLY THROTTLE DATA REPORTING," which is a continuation-in-part of U.S. patent application Ser. No. 15/715,077 titled "LOW-LATENCY STREAMING ANALYTICS" and filed Sep. 25, 2017, the entire contents of each are herein incorporated by reference in their entirety.

FIELD

At least one embodiment of the present disclosure pertains to data analytics for edge devices on a network, and, more particularly, to intelligently throttling data transmission between an edge device and a remote server computer system.

BACKGROUND

Information technology environments can include various types of edge devices. In general, an edge device is an electronic device that can form an endpoint of a network connection. An edge device can be a device on an Internet-of-Things (IoT) (an "IoT device"), that can collect data and exchange data on a network. An IoT device can be connected to the network permanently or intermittently. In some cases, an IoT device may include electronics, software, sensors, and network connectivity components included in other devices, vehicles, buildings, or other items. An edge device may perform machine-to-machine (M2M) communications directly with other devices (e.g., device-to-device communication) over a network and may also physically interact with its environment.

Multiple edge devices within an information technology environment can generate large amounts of data ("edge data") from diverse locations. The edge data may be generated passively (e.g., sensors collecting environmental temperatures) or generated actively (e.g., cameras photographing detected objects). The edge data may include machine-generated data ("machine data"), which can include performance data, diagnostic information, or any other data that can be analyzed to diagnose equipment performance problems, monitor user interactions, and to derive other insights. The large amounts and often-diverse nature of edge data in certain environments can give rise to various challenges in relation to managing, understanding and effectively utilizing the data.

A number of tools are available to analyze data generated by edge devices. To reduce the volume of the potentially vast amount of edge data that may be generated, edge data may be pre-processed based on anticipated data-analysis needs. For example, specified data items may be extracted from the edge data and stored in a database to facilitate efficient retrieval and analysis of those data items at a later time. The remainder of the generated edge data typically is not saved and is discarded during pre-processing. However, as storage capacity becomes progressively less expensive and more plentiful, storing massive quantities of minimally processed or unprocessed data (collectively and individually referred to as "raw data") for later retrieval and analysis is becoming increasingly more feasible.

In general, storing raw edge data and performing analysis on that data later (i.e., at "search time") can provide greater flexibility because it enables analysis of all of the generated edge data instead of only a small subset of it. This may, for example, enable an analyst to investigate different aspects of the edge data that previously were unavailable for analysis because massive amounts of edge data were discarded.

However, storing and analyzing massive quantities of edge data presents a number of challenges. For example, implementing edge analytics is a computationally intensive process that can push the limits of edge devices that have limited storage and computational capabilities. Moreover, the analytics tools implemented by edge devices fail to benefit from their interconnectedness with other devices.

BRIEF DESCRIPTION OF THE DRAWINGS

One or more embodiments of the present disclosure are illustrated by way of example and not limitation in the figures of the accompanying drawings, in which like references indicate similar elements.

FIG. 4 is a flow diagram illustrating a process performed by a data intake and query system.

FIG. 9 is an operation flow diagram illustrating an example of an operation flow of an edge device according to an embodiment.

FIG. 10 is an operation flow diagram illustrating an example of an operation flow of a server computer system according to an embodiment.

FIG. 12 is a block diagram illustrating components of an edge device connected to a server computer system similar to FIG. 6, and further including components configured to implement an intelligent throttling embodiment.

DETAILED DESCRIPTION

Figure 1:
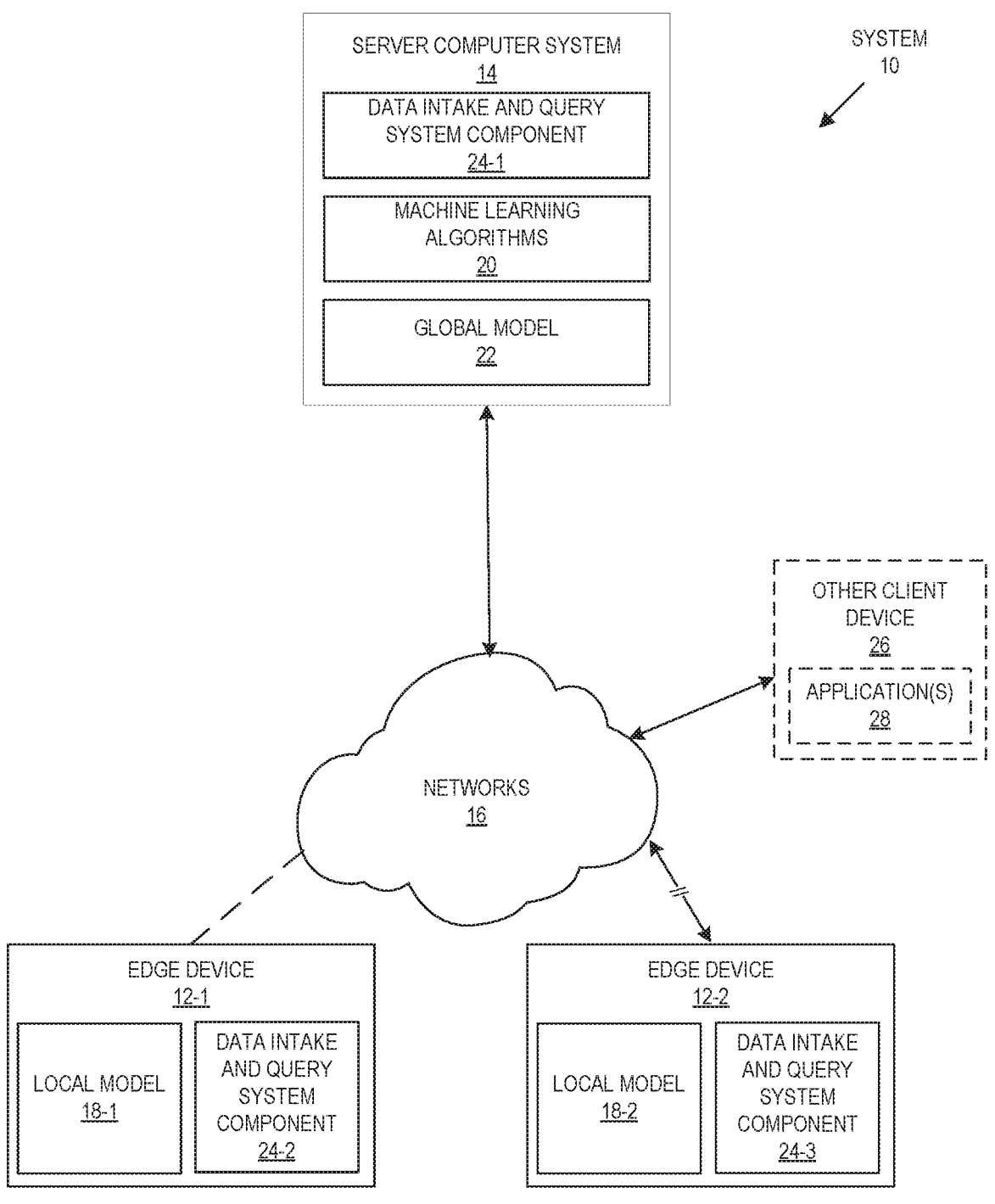
FIG. 1 is a system diagram illustrating a networked computer system ("the system").

In this description, references to "an embodiment," "one embodiment" or the like, mean that the particular feature, function, structure or characteristic being described is included in at least one embodiment of the technique introduced herein. Occurrences of such phrases in this specification do not necessarily all refer to the same embodiment. On the other hand, the embodiments referred to also are not necessarily mutually exclusive.

Introduced herein is a technique for improving the performance of computation on, or quality of data generated by, edge devices distributed on a network. In at least some embodiments introduced here, this is done by using a central server to aggregate data output by multiple edge devices (typically though not necessarily all of which have the same or very similar purpose or functionality), and using the central server to generate, based on the aggregated data, new or modified instructions or data (e.g., parameters) for use by the edge devices in generating subsequent output data, to improve their operation or quality of output data. In certain embodiments this is done by iteratively updating instructions or parameters used as part of data intake and query processes in a system that indexes, stores, and facilitates search and analysis of data generated by the edge devices. In general, the instructions can be executed by processors of the edge devices to perform operations as part of their data intake and query processes. Examples of the instructions include operations for indexing, storing, searching, or extracting raw data or data items from the raw data generated by an edge device.

The edge devices can index and store data generated locally based on inputs to the edge devices. The edge devices can each process the indexed and stored data to perform local actions. For example, instructions can be search instructions used to retrieve data items from raw data generated by the edge devices, which are used to perform local actions. Local instructions at each edge device can be updated according to an instruction generation process implemented globally across all edge devices or locally at each edge device in a given system.

The system in certain embodiments includes a server computer system that can index and store edge data obtained from the network of edge devices (collectively "global edge data"). The server computer system can update global instructions by using the global edge data from all (or at least more than one) of the edge devices. As used herein, the term "global instructions" can include actual instructions, or data, or a combination of instructions and data. The server computer system can send the global instructions or related data to each of the edge devices. Each edge device can then use the global instructions or related data to replace or modify local instructions used to process data generated locally. By locally using at each edge device local instructions that have been updated from data generated by itself and other edge devices, the system can improve the performance of each edge device based on the data acquired by the network of distributed edge devices.

During operation, at least some of the edge devices can be communicatively connected from the server computer system intermittently. Such a connection can be via a wired or wireless link or via a combination of wired and wireless links, and can be direct or indirect. Edge data and global instructions or related data can be exchanged between an edge device and the server computer system while the edge device is connected to the server computer system. The edge device can continue to operate using the local instructions even when the edge device is disconnected from the server computer system. In some embodiments, any of the edge devices or server computer systems can implement schemas in accordance with the local or global instructions, respectively, to extract data items from unprocessed data or minimally processed data ("raw data").

Various other features of the technique introduced here to iteratively update instructions or parameters (or other data) used by the edge devices will become apparent from the description that follows. First, however, it is useful to consider an example of an environment and system in which the technique can be employed, as will now be described.

1.0 General Overview

The embodiments disclosed herein generally refer to a system of distributed edge devices connected to a server computer system over a network. However, embodiments of the disclosed system can include many other computing components, such as other servers, sensors, routers, client devices, gateways and host devices that are not described herein for the sake of brevity but are well within the scope of the disclosed embodiments.

FIG. 1 is a system diagram illustrating a networked computer system according to an embodiment. The system 10 includes distributed edge devices 12-1 and 12-2 (also referred to collectively and individually as edge devices 12) and a server computer system 14. The edge devices 12 can be communicatively connected to the server computer system 14 over one or more networks 16. As indicated above, an edge device is generally an electronic device that can form an endpoint connection of a network. Examples of an edge device include a mobile device and an IoT device. For example, the edge devices 12 can be unmanned aerial vehicles (commonly referred to as drones) that connect to the server computer system 14 over the network 16 when the drones are within range of the wireless networks 16 but are disconnected from the network 16 otherwise.

At least some of the edge devices 12 may be only intermittently connected from the networks 16. As shown in FIG. 1, for example, edge device 12-1 is disconnected from the network 16 while edge device 12-2 is connected to the network 16. The edge devices 12 can generate edge data and provide the edge data to the server computer system 14 over the networks 16. In some embodiments, the edge devices 12 can operate autonomously or semi-autonomously to carry out designated tasks. In some embodiments, the edge devices 12 can operate under the control of a user to carry out tasks.

Each of the edge devices 12 can generate edge data locally based on inputs received by the respective edge devices 12, according to their designed functionality. For example, a drone that includes a camera can capture images of objects to generate image data. The edge devices 12 can process the edge data, perform requests from the server computer system 14, and perform numerous other computational tasks. For example, drones can process edge data with local models to identify objects in the captured images. During operation, the edge devices 12 may generate significant volumes of edge data.

The volume of edge data generated by the edge devices 12 can grow at very high rates as the number of edge devices included in the system 10 grows. Examples of edge data can include sensor data or other data generated from inputs to the edge devices 12, from which the edge devices 12 can be used to perform local actions. For example, edge data can include temperature inputs or other parameters obtained by sensors of the edge devices 12. Other examples of edge data can include application program data, system logs, network packet data, error logs, stack traces, and performance data. Edge data can also include diagnostic information, configurations, process control settings, actuator commands and other physical output commands, and many other types of data that can be analyzed to perform local actions, diagnose performance problems, monitor interactions, and derive other insights.

A number of tools are available to analyze edge data. The edge devices 12 or the server computer system 14 can use these tools to analyze the edge data. For example, the edge data can be communicated to the server computer system 14 from the edge devices 12 over a networks 16 when connected over the networks 16. Thus, the server computer system 14 could analyze the edge data generated by the edge devices 12. The edge devices 12 can perform actions based on the analyzed data, when returned over the network 16. In some cases, the server computer system 14 can instruct the edge devices 12 to perform actions based on an analysis performed at one or more of the edge devices 12 or at the server computer system 14.

In the illustrated embodiment, the edge devices 12 include local instructions 18. In general, the local instructions 18 can be executed by processors of the edge devices 12 to perform operations on edge data, such as indexing, storing, searching, or extracting data items from raw data generated by an edge device. For example, the instructions 18 can dictate processes for retrieving data items from raw data generated by an edge device. The edge devices 12 can then use the retrieved data items to perform local actions.

Implementing local instructions at the edge devices 12 presents challenges. For example, the edge devices 12 may be deployed with local instructions 18 to extract data items from raw edge data for a particular application. However, the local instructions 18 can become stale when the environment in which the edge devices 12 are deployed changes such that the extracted data items are useless for the intended application. Moreover, the intended application for the edge devices can change and the local instructions 18 may not support the new application. As such, the edge devices 12 cannot adapt to changing environments or applications. Solutions can include updating the local instructions 18 locally at each edge device 12. However, this solution requires physical access to the edge devices 12, which may be infeasible if the edge devices 12 are installed in remote or isolated locations, or are generally inaccessible. Moreover, this solution requires an undesirable amount of manual effort to update and manage the network of distributed edge devices 12 individually.

Other solutions can include remotely updating the local instructions 18 from a centralized location such as the server computer system 14. However, this solution similarly requires an undesirable amount of manual effort to manage each of the edge devices 12. Moreover, as indicated above, the edge devices 12 can be intermittently connected to the networks 16 such that the instructions from the server computer system 12 may not be received by edge devices 12 in a timely manner.

To overcome the aforementioned drawbacks, embodiments of the disclosed system 10 can include instruction generation algorithms 20 at the server computer system 14. The instruction generation algorithms 20 produce and update global instructions 22 based on edge data collected from all the edge devices 12. In some embodiments, instructions generation algorithms 20 include machine learning algorithms. The global instructions 22 or related data can then be communicated to the edge devices 12 when they are connected to the network 16. As such, the edge devices 12 to can update their local instructions 18 based on the global instructions 22. For example, the server computer system 14 can update the global instructions 22 based on the edge data generated by all the edge devices 12, and push an instance of the global instructions 22, a portion of the global instructions 22 or information related to the global instructions 22, to each edge device 12. The data received by the edge devices 12 can be used to replace or update each of the local instructions 18 based on the updated global instructions 22. This process is described in greater detail below.

When executed, the local instructions 18 can reduce or summarize the vast amounts of minimally processed or unprocessed data ("raw data") generated by an edge device, which can be subsequently analyzed to perform local actions. For example, in some embodiments, the local instructions 18 may be used to pre-process the raw data based on anticipated data analysis needs. In particular, edge data can be pre-processed with pre-specified data fields to extract data items from raw data. The extracted data items are stored to facilitate subsequent retrieval and analysis of those data items later at search time. In some embodiments, the remaining of the raw data is not saved and is discarded during pre-processing. Hence, the remaining raw data is not available at search time. However, discarding massive amounts of raw data can be undesirable because valuable insights could be lost.

As storage capacity becomes progressively less expensive, there are fewer incentives to discard raw data and many reasons to retain more of the raw data. Less expensive storage is presently making it feasible to store massive quantities of raw data for later retrieval and analysis. In general, storing raw data and performing analysis operations at search time in accordance with the local instructions 18 can provide greater flexibility because it enables searching all of the raw data instead of searching only a small subset of it. This may enable investigating different aspects of the raw data beyond the predetermined data items. As such, the disclosed embodiments can allow for searching through data that was previously unavailable for analysis.

However, analyzing and searching massive quantities of raw data presents a number of challenges. For example, the edge devices may generate many different types and formats of edge data (e.g., sensor data, system logs, network packet data (e.g., wire data), application program data, error logs, stack traces, system performance data, operating system data, and virtualization data) from thousands of different components, which can collectively be very time-consuming to analyze. In another example, edge devices may generate large amounts of information relating to data access, application performance, operating system performance, and network performance. There can be tens of millions of edge devices that report these types of information.

These challenges can be addressed by using an event-based data intake and query system, such as the SPLUNK® ENTERPRISE system developed by Splunk Inc. of San Francisco, California. The SPLUNK® ENTERPRISE system is a leading platform for providing real-time operational intelligence that enables organizations to collect, index, and search raw data collected from various sources such as websites, applications, servers, networks, and edge devices. The SPLUNK® ENTERPRISE system is particularly useful for analyzing data from various data input sources, including sensor data, data in system log files, and network data. Although many of the techniques described herein are explained with reference to a data intake and query system similar to the SPLUNK® ENTERPRISE system, these techniques are also applicable to other types of data systems.

Figure 2:
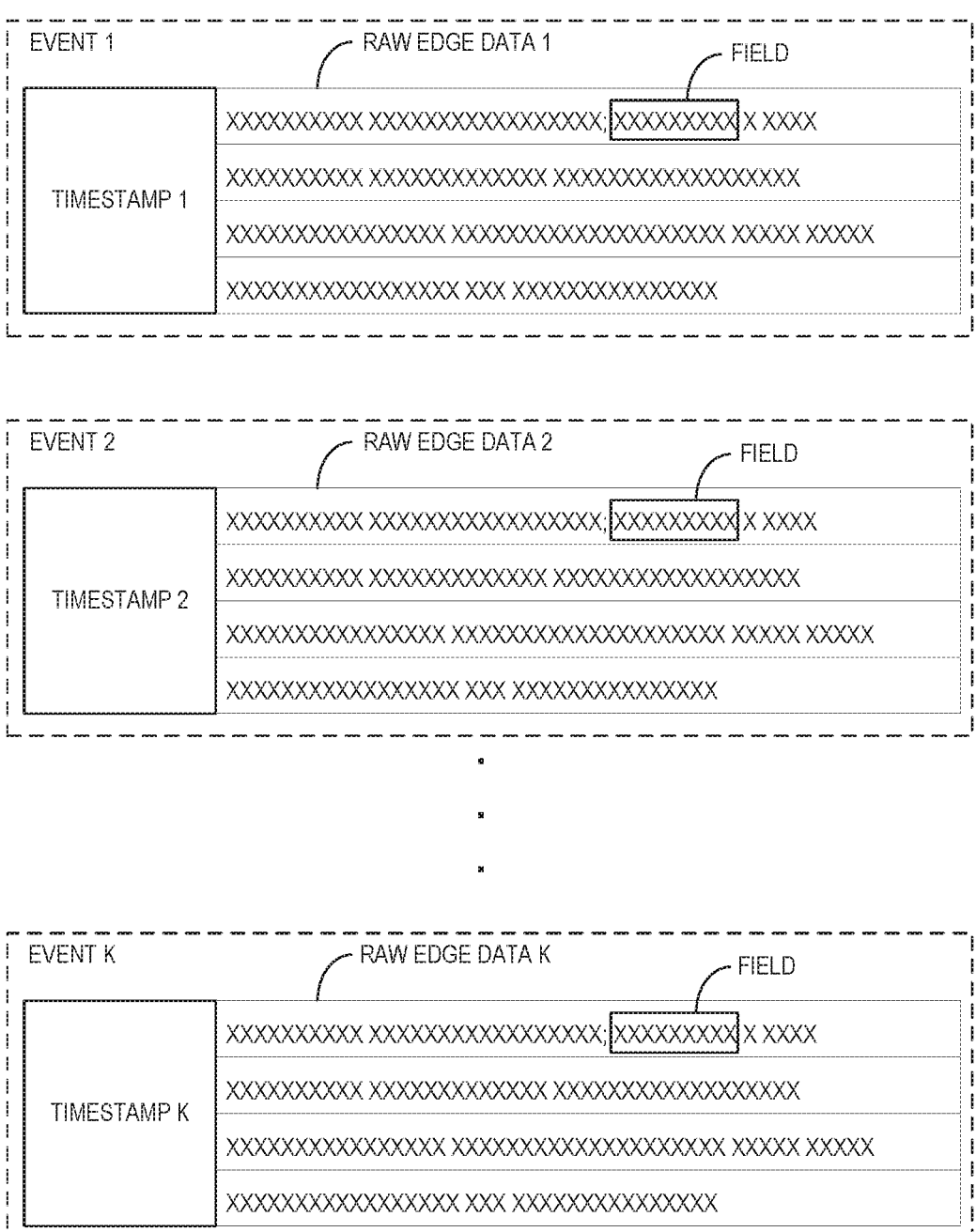
FIG. 2 is a block diagram illustrating a series of events, including raw edge data.

In the SPLUNK® ENTERPRISE system, raw data is collected and stored as structured "events." In this context, the global or local instructions of the disclosed embodiments can dictate the collecting and storing of the events. For example, FIG. 2 is a block diagram illustrating a series of events including raw edge data according to an embodiment. An event includes a portion of raw data and is associated with a specific point in time. For example, events may be derived from "time series data," where the time series data comprises a sequence of data points (e.g., performance measurements from a computer system) that are associated with successive points in time. As shown, each event 1 through K can be associated with a timestamp 1 through K that can be derived from the raw data in the respective event, determined through interpolation between temporally proximate events having known timestamps, or determined based on other configurable rules for associating timestamps with events.

In some instances, raw data can have a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. As shown in FIG. 2, each event 1 through K includes a field that is nine characters in length beginning after a semicolon on a first line of the raw edge data, for example. In certain embodiments, these fields can be queried to extract their contents.

In addition to edge devices, examples of components in a computing environment that may generate raw data from which events can be derived include, but are not limited to, web servers, application servers, databases, firewalls, routers, operating systems, and software applications that execute on computer systems. The data generated by such data sources can include, for example and without limitation, server log files, activity log files, configuration files, messages, network packet data, performance measurements, and sensor measurements.

The SPLUNK® ENTERPRISE system uses flexible schema to specify how to extract information from the event data. In some embodiments, the global or local instructions of the disclosed embodiments may be or include the schema. A flexible schema may be developed and redefined, as needed. Note that a flexible schema may be applied to event data "on the fly," when it is needed (e.g., at search time, index time, and ingestion time). When the schema is not applied to event data until after the raw data is indexed or at search time, it may be referred to as a "late-binding schema."

During operation, the SPLUNK® ENTERPRISE system starts with raw data (e.g., one or more system logs, streams of network packet data, sensor data, application program data, error logs, stack traces, or system performance data). The system divides this raw data into segments of raw data delineated by time segments (e.g., blocks of raw data, each associated with a specific time frame). The segments of raw data are indexed as timestamped events, corresponding to their respective time segments as shown in FIG. 2. The system stores the timestamped events in a data store.

The system then enables running queries against the stored data to, for example, retrieve events that meet criteria specified in a query, such as containing certain keywords or having specific values in defined fields. In some embodiments, the global or local instructions may be or include the queries used to retrieve the events. As used herein throughout, data that is part of an event is referred to as "event data." In this context, the term "field" refers to a location in the event data containing one or more values for a specific data item. As will be described in more detail below, the global or local instructions can include the fields, which are defined by extraction rules (e.g., regular expressions) that derive one or more values from a portion of raw data in each event that has a particular field specified by an extraction rule. The set of values so produced are semantically related (such as an IP address), even though the raw data in each event may be in different formats (e.g., semantically related values may be in different positions in the events derived from different sources).

As noted above, the SPLUNK® ENTERPRISE system can utilize a late-binding schema on event data while performing queries on the events, in accordance with embodiments of the global or local instructions. One aspect of a late-binding schema is applying "extraction rules" to event data to extract values for specific fields during search time. More specifically, the extraction rules for a field can themselves include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured in accordance with global or local instructions to automatically generate extraction rules for certain field values in the events when the events are being created, indexed, or stored, or possibly at a later time. Alternatively, a user may manually define extraction rules for fields by using a variety of techniques. In contrast to a conventional schema for a database system, a late-binding schema is not defined at data ingestion time (i.e., on or before the raw data is indexed for storage). Instead, the late-binding schema can be developed on an ongoing basis until the time a query is actually executed (which could be long after the raw data is indexed). As a result, extraction rules for the fields in a query may be provided in the query itself, or they may be located during execution of the query.

Hence, as a user learns more about the raw data in the events, the user can continue to refine the instructions including the late-binding schema by adding new fields, deleting fields, or modifying the field extraction rules for use the next time the schema is applied by the system. Because the SPLUNK® ENTERPRISE system maintains the underlying raw data and can use a late-binding schema for searching the raw data, users are enabled to continue investigating and to learn valuable insights about the raw data. In contrast, conventional processes in database systems discard the raw data that was not indexed as predetermined data items. As a result, users of conventional database systems are limited to only searching predetermined data items.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

In some embodiments, the global or local instructions may dictate that the raw data utilized by the disclosed embodiments can be stored as events that are indexed by timestamps but are also associated with predetermined data items. This structure is essentially a modification of conventional database systems that require predetermining data items for subsequent searches. These systems can be modified to retain the remaining raw data for subsequent reprocessing for other predetermined data items in accordance with subsequent instructions.

Specifically, the raw data can be divided into segments and indexed by timestamps. The predetermined data items can be associated with the events indexed by timestamps. The events can be searched only for the predetermined data items during search time, but the remaining raw data is available for subsequent reprocessing and re-indexing for searching other data items. In other words, the events can be re-processed later in time to re-index the raw data, to generate events with new predetermined data items in accordance with subsequent instructions.

2.0 Operating Environment

Referring back to FIG. 1, the server computer system 14 and edge devices 12 are examples of computing devices included in the system 10 that are interconnected via one or more networks 16. The networks 16 broadly represent one or more LANs, WANs, cellular networks (e.g., LTE, HSPA, 3G, and other cellular technologies), or networks using any of wired, wireless, terrestrial microwave, or satellite links, and may include the public Internet.

The computing devices of system 10 include any combination of hardware and software configured to implement the various logical components described herein. For example, the computing devices may include one or more memories that store instructions for implementing the various components described herein, one or more hardware processors configured to execute the instructions stored in the one or more memories, and various data repositories in the one or more memories for storing data structures utilized and manipulated by the various components.

The system 10 includes a data intake and query system 24. The data intake and query system 24 can be located exclusively at the server computer system 14, or components of the data intake and query system 24 can be distributed across the server computer system 14 and the edge devices 12 (as represented collectively by elements 24-1, 24-2 and 24-3). In some embodiments, any or each of the server computer system 14 and the edge devices 12 can include its own data intake and query system 24. Examples of configurations and operations of the data intake and query system 24 are described further below.

The edge devices 12 discussed above can represent a broader category of computing devices commonly referred to as "client devices," which can each be operated under the control of a user. For example, FIG. 1 shows a client device 26 that can communicate with the components of the system 10 (e.g., the edge devices 12 or the server computer system 14) to receive or exchange information over the network 16. For example, a communication between the client device 26 and the components of the system 10 can include sending various requests and receiving data packets.

In one example, the client device 26 or applications 28 running on the client device 26 may initiate communications with applications running on the edge devices 12 or the server computer system 14 to request specific content (e.g., edge data), and the applications at the edge devices 12 or the server computer system 14 may respond with the requested content stored in one or more data packets. Hence, the components of the system 10 can also represent a broader category of computing devices referred to as "host devices," which can host each other.

2.1 Data Intake and Query System

Figure 3:
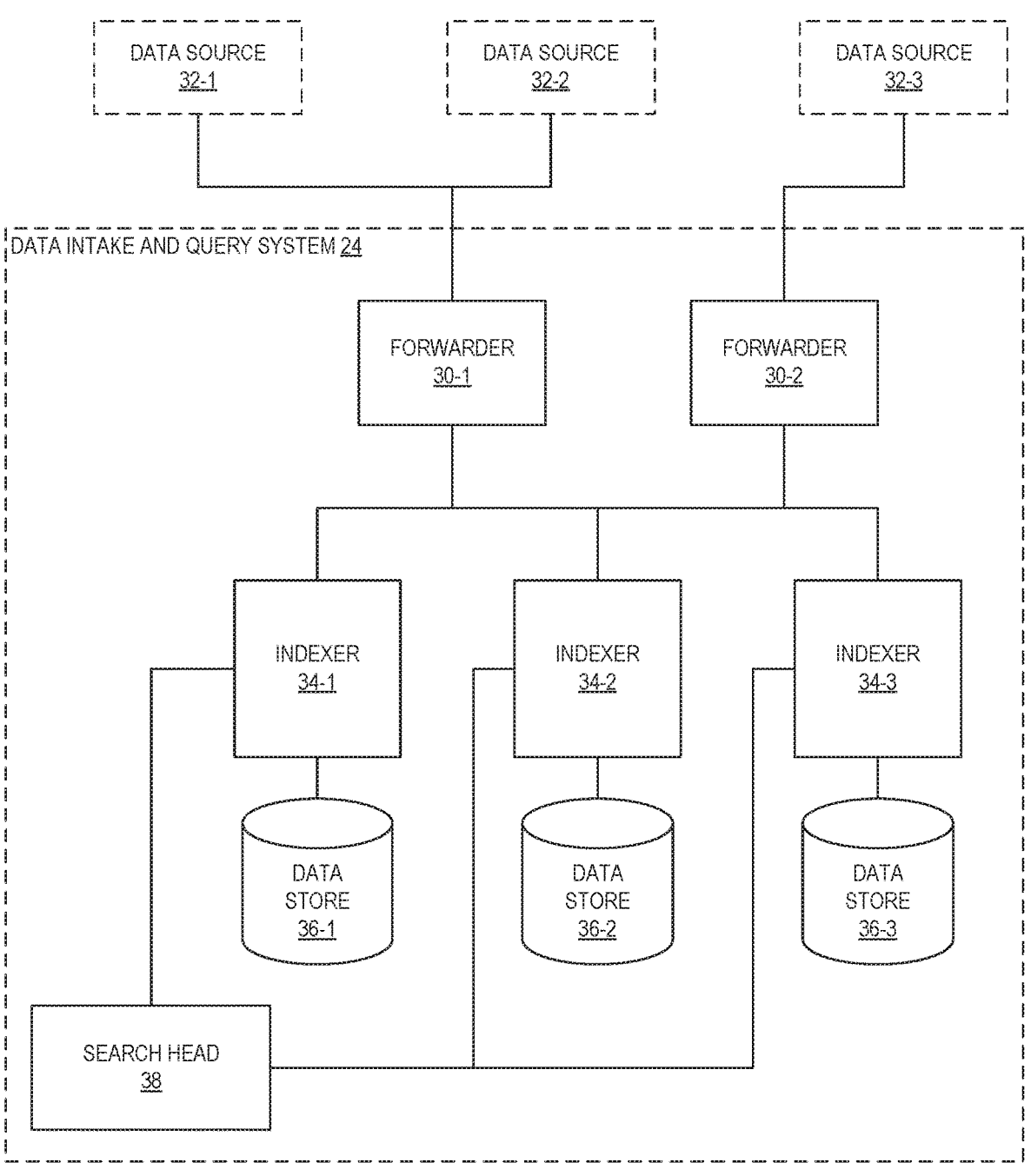
FIG. 3 is a block diagram illustrating components of a data intake and query system.

The data intake and query system 24 can be similar to or include components of the SPLUNK® ENTERPRISE system described above to create events from raw data in accordance with global or local instructions to improve storage and analysis of such data. For example, FIG. 3 is a block diagram illustrating components of the data intake and query system 24 according to an embodiment. The data intake and query system 24 includes one or more forwarders 30 that receive data from a variety of input data sources 32, and one or more indexers 34 that process and store the data in one or more data stores 36. The forwarders 30 and indexers 34 can be included in a single computing system, or may alternatively comprise separate processes executing on multiple computer systems. For example, the forwarders 30 could be located at the edge devices 12, and the indexers could be located at the server computer system 14.

Each data source 32 broadly represents a distinct source of data that can be consumed by the data intake and query system 24. An example of the data source 32 includes the data generated by sensors of the edge devices 12. Other examples of the data sources 32 include, without limitation, data files, directories of files, event logs, and registries, or any data sent over the networks 16.

During operation, the forwarders 30 can identify which indexers 34 should receive data collected from the data sources 32 and forward the data to the appropriate indexers 34. The forwarders 30 can also perform operations on the data before forwarding, including removing extraneous data, detecting timestamps in the data, parsing data, indexing data, routing data based on criteria relating to the data being routed, or performing other data transformations.

In an embodiment, the forwarders 30 may comprise a service accessible to the edge devices 12 or server computer system 14 over the networks 16. For example, one type of forwarder may be located at an edge device 12 and can be capable of consuming vast amounts of real-time data generated by the edge device 12, and then forward the generated data to the server computer system 14. In some embodiments, one type of forwarder 30 may be located at the server computer system 14 and capable of consuming vast amounts of data from a potentially large number of edge devices 12. Accordingly, a forwarder may, for example, comprise a computing device that implements multiple data pipelines or "queues" to handle forwarding of data to the indexers 34.

A forwarder 30 may also perform many of the functions that are performed by an indexer 34. For example, the forwarders 30 may perform keyword extractions on raw data or parse raw data to create events. The forwarders 30 may generate time stamps for events. Additionally or alternatively, the forwarders 30 may perform routing of events to the indexers 34. The data stores 36 may contain events derived from raw data obtained from a variety of data sources 32, which may be generated by the edge devices 12. Lastly, a search head 38 can perform a search query of the data stored in the data stores 36.

2.1.1 Data Ingestion

FIG. 4 is a flow diagram illustrating a process 400 performed by the data intake and query system 24 according to an embodiment. In some embodiments, any or all of the steps of the process 400 may be defined by the global or local instructions of the system 10. The illustrated data flow is provided for illustrative purposes only, and those skilled in the art would understand that one or more of the steps of the process 400 may be removed, or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.1.2 Input

In step 402, a forwarder receives raw data generated by an input source, such as the data sources 32 shown in FIG. 3. For example, the forwarder may receive a stream of raw sensor data generated at an edge device. In one embodiment, the forwarder receives the raw data and segments the data stream into "blocks," possibly of uniform data size, to facilitate subsequent processing.

In step 404, the forwarder can annotate each segment of raw data with one or more metadata fields. These metadata fields may provide information related to the data segment as a whole and may apply to each event that is subsequently derived from the raw data in the data segment. For example, the metadata fields may include separate fields specifying each of a host, a source, and a source type related to the data segments.

A host field may contain a value identifying a host name or IP address of the edge device that generated the raw data. A source field may contain a value identifying a source of the raw data, such as a pathname of a file or a protocol and port related to received network data. A source type field may contain a value specifying a particular source type label for the data. Additional metadata fields may also be included during the input phase, such as a character encoding of the raw data, if known, and possibly other values that provide information relevant to later processing steps. In an embodiment, a forwarder forwards the annotated data segments to another system component (typically an indexer) for further processing.

The SPLUNK® ENTERPRISE system allows forwarding of data from one SPLUNK® ENTERPRISE instance to another, or even to a third-party system. The SPLUNK® ENTERPRISE system can employ different types of forwarders in a configuration. In an embodiment, a forwarder may contain the essential components needed to forward data. It can gather data from a variety of inputs and forward the data to a SPLUNK® ENTERPRISE server for indexing and searching. It also can tag metadata (e.g., source, source type, and host).

In an embodiment, a forwarder has the capabilities of the aforementioned forwarder, as well as additional capabilities. The forwarder can parse and index data before forwarding the data (e.g., associate a time stamp with a portion of data and create an event) and can route data based on criteria, such as source or type of event. It can also index data locally while forwarding the data to another indexer.

2.1.3 Parsing

At step 406, an indexer receives data segments from the forwarder and parses the data to organize the data into events. In an embodiment, to organize the data into events, an indexer may determine a source type associated with each data segment (e.g., by extracting a source type label from the metadata fields associated with the data block) and refer to a source type configuration corresponding to the identified source type. The source type definition may include one or more properties that indicate to the indexer to automatically determine the boundaries of events within the data.

In general, these properties may include regular expression-based rules or delimiter rules where, for example, event boundaries may be indicated by predefined characters or character strings. These predefined characters may include punctuation marks or other special characters, including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

In step 408, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of raw data in the event, to interpolate time values based on timestamps associated with temporally proximate events, to create a timestamp based on a time the event data was received or generated, to use the timestamp of a previous event, or to use any other rules for determining timestamps.

In step 410, the indexer associates each event with one or more metadata fields, including a field containing the timestamp (in some embodiments, a timestamp may be included in the metadata fields) determined for the event. These metadata fields may include a number of "default fields" that are associated with all events, and may also include one more custom fields, as defined by a user. Similar to the metadata fields associated with the data segments in step 404, the default metadata fields associated with each event may include a host, source, and source type field, including or in addition to a field storing the timestamp.

In step 412, an indexer may optionally apply one or more transformations to raw data included in the events created in step 406. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.1.4 Indexing

In steps 414 and 416, the indexer can optionally generate a keyword index to facilitate fast keyword searching for event data. To build a keyword index, in step 414, the indexer identifies a set of keywords in each event. In step 416, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can be generated automatically for some or all of the name-value pairs at the time of indexing. For example, if the string "dest=10.0.1.2" is found in an event, a field named "dest" may be created for the event, and assigned a value of "10.0.1.2".

In step 418, the indexer stores the events with an associated timestamp in a data store. The timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Referring back to FIG. 3, each indexer 34-1 through 34-3 may be responsible for storing and searching a subset of the events contained in a corresponding data store 36. By distributing events among the indexers 34 and data stores 36, the indexers 34 can analyze events for a query in parallel. For example, using map-reduce techniques, each indexer 34-1 through 34-3 returns partial responses for a subset of events to the search head 38, which combines the results to produce an answer for the query. By storing events in buckets for specific time ranges, the indexers may further optimize data retrieval processes by searching buckets corresponding to time ranges that are relevant to a query.

Moreover, events and buckets can also be replicated across different indexers and data stores to facilitate high availability and disaster recovery, as described in U.S. Pat. No. 9,130,971, titled "SITE-BASED SEARCH AFFINITY," filed on 30 Apr. 2014, and in U.S. Pat. No. 9,124,612, titled "MULTI-SITE CLUSTERING," also filed on 30 Apr. 2014, each of which is hereby incorporated by reference in its entirety.

2.2 Query Processing

Figure 5:
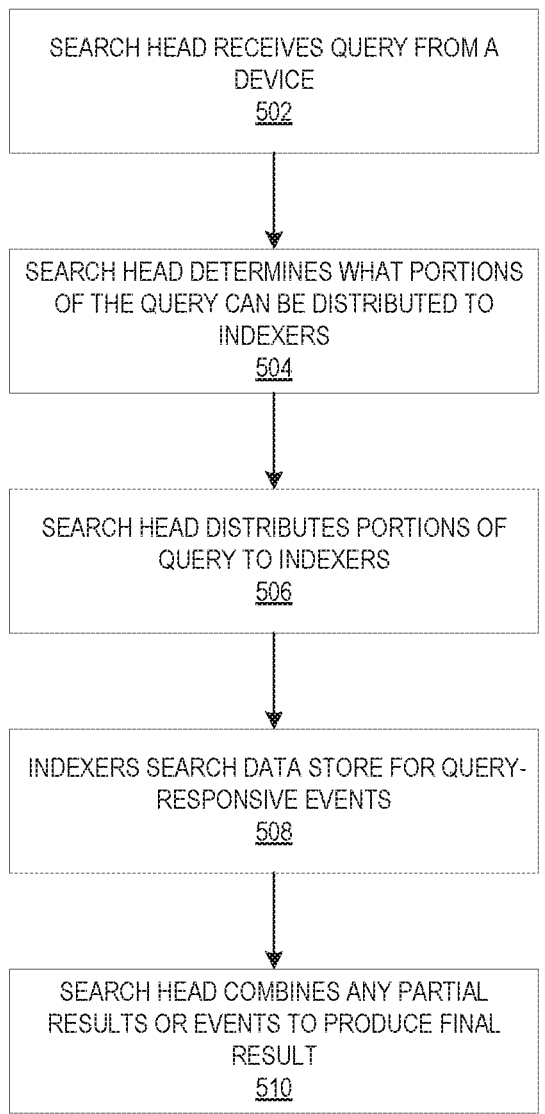
FIG. 5 is a flow diagram illustrating a process performed by a search head and indexers to perform a search query.

FIG. 5 is a flow diagram illustrating a process 500 for how a search head and indexers perform a search query according to an embodiment. In some embodiments, any or all of the steps of the process 500 may be defined by the global or local instructions of the system 10. In step 502, a search head receives a search query from another device. In step 504, the search head analyzes the search query to determine what portion(s) of the query can be delegated to indexers and what portions of the query can be executed locally by the search head.

In step 506, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in the figures) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

In step 508, the indexers to which the query was distributed search data stores associated with them for events that are responsive to the query. To determine which events are responsive to the query, the indexer searches for events that match the criteria specified in the query. These criteria can include matching keywords or specific values for certain fields. The searching operations at step 508 may use the late-binding schema to extract values for specified fields from events at the time the query is processed. In an embodiment, one or more rules for extracting field values may be specified as part of a source-type definition. The indexers may then either send the relevant events back to the search head, or use the events to determine a partial result and send the partial result back to the search head.

In step 510, the search head combines the partial results or events received from the indexers to produce a final result for the query. This final result may comprise different types of data, depending on what the query requested. For example, the results can include a listing of matching events returned by the query, or some type of visualization of the data from the returned events. In another example, the final result can include one or more calculated values derived from the matching events.

The results generated by the system 10 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs," and the client may retrieve the results by referring to the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.3 Field Extraction

Referring back to FIG. 3, in accordance with the global or local instructions of the system 10, the search head 38 allows for searching and visualizing event data extracted from raw data received from homogenous data sources. The search head 38 includes various mechanisms, which may additionally reside in an indexer 34, for processing a query. SPLUNK Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 38 uses extraction rules to extract values for the fields associated with a field or fields in the event data being searched. The search head 38 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 38 can apply the extraction rules to event data that it receives from indexers 34. The indexers 34 may apply the extraction rules to events in an associated data store 36. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

3.0 Computing Architecture

As indicated above, the edge devices 12 can represent a broader category of computing devices referred to as client devices, which can include any computing device capable of interacting with the server computer system 14 over the one or more networks 16. Reference to an edge device in this disclosure is solely to aid in understanding a particular non-limiting embodiment. In addition to edge devices, examples of client devices include, without limitation, smart phones, tablet computers, handheld computers, wearable devices, laptop computers, desktop computers, servers, portable media players, gaming devices, and so forth.

3.1 Client Side Architecture

Figure 6:
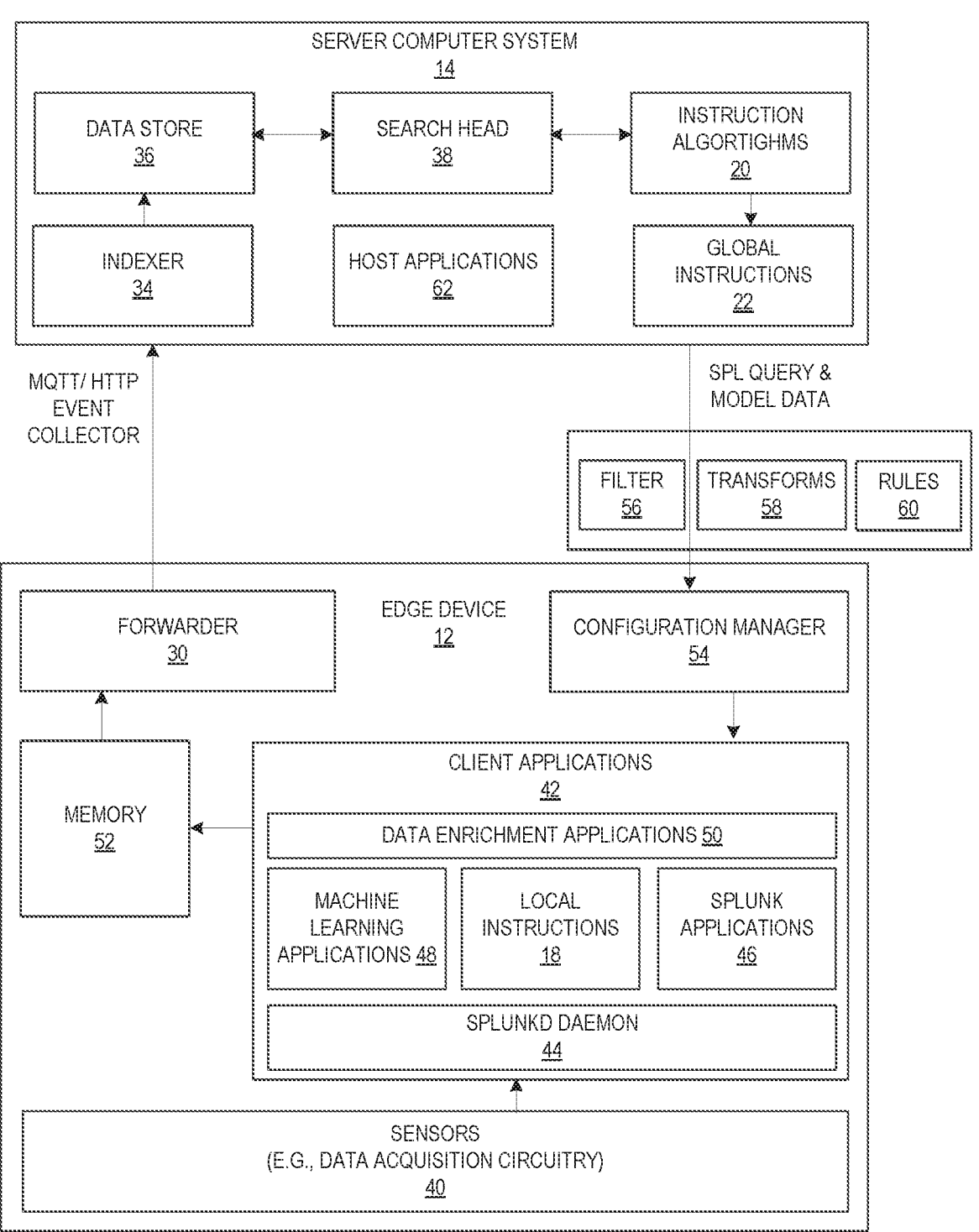
FIG. 6 is a block diagram illustrating components of an edge device connected to a server computer system.

FIG. 6 is a block diagram illustrating components of an edge device 12 connected to the server computer system 14 according to an embodiment. In the illustrated embodiment, the edge device 12 includes one or more sensors 40, which broadly represent data acquisition circuitry. The sensors 40 can generate raw data that can be used by the edge device 12 to perform one or more local actions. The sensors 40 may generate various types of raw data from electrical or optical input signals, etc. For example, a thermocouple is a sensor that generates voltage output data in response to environmental temperature inputs. In another example, an image sensor can capture and convey information that constitutes an image.

The edge device 12 may include one or more client applications 42 that may be configured to monitor or generate edge data in response to a trigger in the code of the client applications 42 or other triggering events, and to store the edge data on memory 52. In particular, the edge data can be stored in one or more data records on the memory 52.

The client applications 42 may include a SPLUNKD daemon 44, which operates as a background process that performs various operations without direct interaction from another device or a user. For example, the SPLUNKD daemon 44 can run as a background process to collect raw data from the sensors 40.

The edge device 12 may host or execute one or more SPLUNK applications 46, machine learning applications 48, or data enrichment applications 50. These client applications 42 can collectively implement functions including optimized data collection, monitoring, management, etc. The client applications 42 can enable, manage, or control operations of the edge device 12 in accordance with the local instructions 18. For example, the SPLUNK applications 46 may manage the behavior of the sensors 40 that capture images of objects or process the image data in accordance with the local instructions 18.

The machine learning applications 48 may include a machine learning local model (not shown), which can be trained with edge data. Local edge data can further be processed with the local model to make predictions used to determine whether the edge device 12 performs a local action, and the type of location action that will be performed.

The data enrichment applications 50 can enhance the functionality of the edge device 12. For example, a data enrichment application can be applied to annotate outputs of the machine learning applications 48. For example, a data enrichment application can augment detection of objects by an image sensor to perform real-time video analytics such as object detection, facial detection and recognition, multi-object tracking, etc. The client applications 42 may include a "plug-in" or "extension" to another application, such as a web browser plug-in or extension. The client applications 42 may interact with the server computer system 14 or other edge devices over the networks 16.

In an embodiment, the client applications 42 may include monitoring functions that monitor edge data or facilitate generating edge data related to the edge device's operating state, including monitoring local data and collecting other edge device or application-specific information. The monitoring functions may be integrated into a plug-in, an extension, or any other type of add-ons. The monitoring functions may also be a stand-alone process.

In an embodiment, the monitoring functions may be created using a software development kit (SDK) that can incorporate monitoring code into the client applications 42. The SDK or other code for implementing the monitoring functionality may be offered by a provider of the data intake and query system 24. In such cases, the provider of the data intake and query system 24 can implement the custom code so that edge data is sent to the data intake and query system 24 to facilitate analysis of the edge data by a developer of the client applications 42 or other users.

In an embodiment, the custom monitoring code may be incorporated into the code of the client applications 42 to call or otherwise invoke the monitoring functionality. A developer of any of the client applications 42 can add one or more lines of code into a client application to trigger the monitoring functionality as desired. Code that triggers the monitoring functions may be referred to as a monitor trigger. For instance, a monitor trigger may be included at or near the beginning of the executable code of a client application such that the monitoring functionality is initiated or triggered as a client application is launched, or included at other points in the code that correspond to various actions of the client applications 42.

In an embodiment, the monitoring functions may monitor one or more aspects of network traffic sent or received by the client applications 42 over the networks 16. The network traffic can be analyzed to determine a number of network performance statistics. Monitoring network traffic may enable information to be gathered particular to the network performance associated with any of the client applications 42.

Network performance data refers to data that indicates information about the network or network performance. Network performance data may include, for instance, a URL request, a connection type (e.g., HTTP or HTTPS), a connection start time, a connection end time, an HTTP status code, request length, response length, request headers, response headers, connection status (e.g., completion, response time(s), or failure), and the like. Upon obtaining network performance data indicating performance of the networks 16, the network performance data can be sent to the data intake and query system 24 for analysis.

Upon developing the client applications 42 that incorporate the monitoring functionality, the client applications 42 can be distributed to the edge devices 12. The client applications 42 generally can be distributed to the edge devices 12 in any manner, or they can be pre-loaded. In some cases, the client applications 42 may be distributed to the edge device 12 via an application marketplace or other application distribution system. For instance, an application marketplace or other application distribution system might distribute the application to a client device based on a request from the edge device 12 to download the application.

Examples of functionality that enables monitoring performance of a client device are described in U.S. patent application Ser. No. 14/524,748, titled "UTILIZING PACKET HEADERS TO MONITOR NETWORK TRAFFIC IN ASSOCIATION WITH A CLIENT DEVICE," filed on 27 Oct. 2014, and which is hereby incorporated by reference herein in its entirety.

In an embodiment, the monitoring functionality may monitor and collect performance data related to an aspect of the operational state of client applications 42 or edge device 12. For example, the monitoring functions may collect edge device performance information by monitoring one or more edge device operations, or by making calls to an operating system or one or more other applications executing on the edge device 12 for performance information. Edge device performance information may include, for instance, a current wireless signal strength of the edge device 12, a current connection type and network carrier, current memory performance information, a geographic location of the device, a device orientation, and any other information related to the operational state of the edge device 12.

In an embodiment, the client applications 42 may also monitor and collect other device profile information, including, for example, a type of edge device, a manufacturer and model of the edge device, versions of various software applications installed on the edge device, and so forth.

In the illustrated embodiment, components of the data intake and query system 24 are distributed between the edge device 12 and the server computer system 14. Specifically, the edge device 12 includes the forwarder 30, which can forward data to the indexer 34 of the server computer system 14. In an embodiment, the forwarder 30 can send transformed events in batches to the server computer system 14. As detailed below, the server computer system 14 further includes the data store 36 to store events, as detailed above, which can be searched by the search head 38 to extract data items. Further, the extracted data items can be used by the machine learning algorithms 54 to update/train the global model 22.

Accordingly, the forwarder 30 enables event collection by the server computer system 14. In some embodiments, the edge data can be communicated to the server computer system 14 using Hypertext Transfer Protocol (HTTP) or MQ Telemetry Transport (MQTT) protocols. Specifically, MQTT is an M2M IoT connectivity protocol useful for connections with remote locations where a relatively small code footprint is required or network bandwidth is limited.
3.2 Server Side Architecture In the illustrated embodiments, the server computer system 14 can send pipelined search language queries, such as SPLUNK Processing Language (SPL) queries, and global instructions 22 or related data received by a configuration manager 54 to configure (or reconfigure) an edge device 12. For example, an SPL query may configure the edge device 12 to monitor certain edge data. The global instructions 22 or related data may be used at the edge device 12 configure (or reconfigure) the local instructions 18. For example, the global instructions 22 or related data can be used to replace or update the local instructions 18 with the global instructions 22. One or more filters 56, transforms 58 or rules 60 may be used to configure the edge device 12 to send summary data, based on its locally acquired data, back to the server computer system 14. The data summary sent from each of the edge devices 12 then can form global training data to train the global model 22 on the server computer system 14. The filters 56, transforms 58 or rules 60 can be included in each edge device 12.

The server computer system 14 can represent a broader category of computing devices referred to as host devices, which can include any number of computers, virtual machine instances, or data centers that can be configured to host or execute one or more instances of host applications (e.g., host applications 62). The server computer system 14 or another host device may be involved, directly or indirectly, in processing requests received from the edge device 12 for a network-based service. For example, a network-based service provider may configure one or more host devices and host applications to collectively implement the network-based application.

The edge device 12 can communicate with the host applications 62 to exchange information. The communication between the edge device 12 and the host applications 62 may be based on HTTP or any other network protocol. Content delivered from the host applications 62 to the edge device 12 may include, for example, HTML documents, media content, etc. The communication between the edge device 12 and host applications 62 may include sending requests and receiving data packets. For example, the client applications 42 may initiate communication with host applications 62 by requesting a specific resource, and the host device may respond with the requested content stored in one or more response packets.

A host device may generate various types of performance data during operation of the host applications 62, including event logs, network data, sensor data, and other types of machine-generated data. The host data or data related to an interaction between the host device and the edge device 12 could be subjected to data intake and query processes.
3.3 Cloud-Based Architecture The following implementations may incorporate a data intake and query system, such as the one described in U.S. patent application Ser. No. 15/339,912, entitled "METRICS STORE SYSTEM," filed on Oct. 31, 2016, now published as U.S. Patent Application Publication No. 2018/0089290 A1, which is hereby incorporated by reference in its entirety. In addition, as shown in the figures herein, various embodiments may refer to a data intake and query system 24 that includes one or more of a search head 38, an indexer 34, and a forwarder 30. In other implementations, data intake and query system 24 may have a different architecture, but may carry out indexing and searching in a way that is indistinguishable or functionally equivalent from the perspective of the end user. For example, data intake and query system 24 may be re-architected to run in a stateless, containerized environment. In some of these embodiments, data intake and query system 24 may be run in a computing cloud provided by a third party, or provided by the operator of the data intake and query system 24. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources.

Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 24.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

4.0 Embodiments of System Operations

Figure 7:
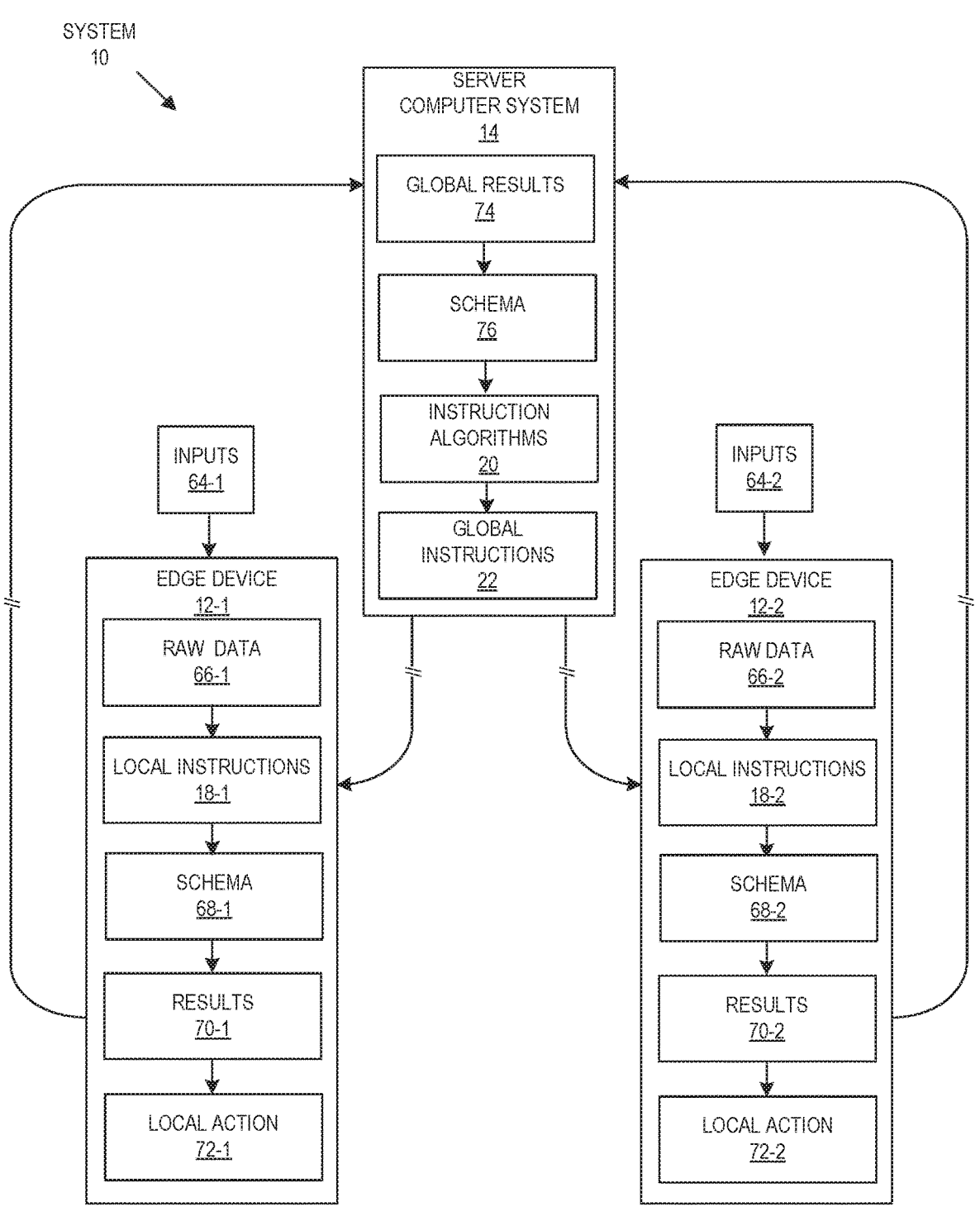
FIG. 7 is a block diagram illustrating an operation of an embodiment of the system configured to iteratively update local instructions for data intake and query processes to improve analytics for the edge devices.
Figure 8:
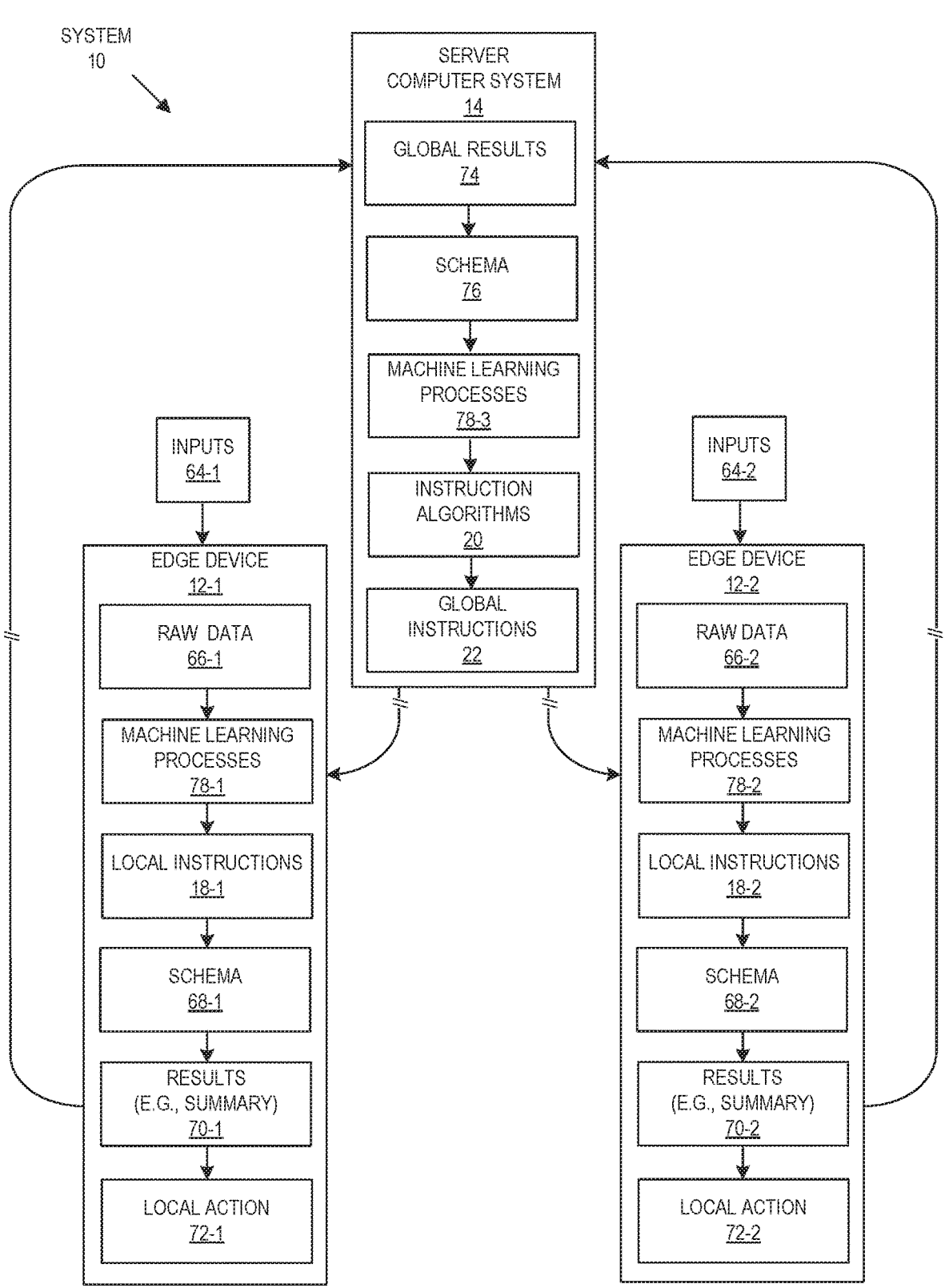
FIG. 8 is a block diagram illustrating an operation of an embodiment of the system to improve analytics for edge devices similar to FIG. 7, but which can implement machine learning at the edge devices or the server computer system.

FIGS. 7 and 8 are block diagrams that illustrate operations of the system 10 implementing components of the disclosed technology in different combinations. Although shown as two separate embodiments, the components illustrated in these figures can be combined in various ways to achieve a desired behavior for the system 10. Moreover, embodiments may omit components or include other components not shown but known to persons skilled in the art.

4.1.1 Instructions for Data Intake and Query Processes

FIG. 7 is a block diagram illustrating an operation of an embodiment of the system 10 configured to iteratively update local instructions for data intake and query processes to improve analytics for the edge devices 12. In the illustrated embodiment, the edge devices 12 can receive local inputs 64 to generate raw data 66 according to their designed functions. As part of their data intake and query processes, the edge devices 12 execute local instructions 18 on the vast amounts of raw data 66. The local instructions 18 can cause the edge devices 12 to create time-indexed events including segments of the raw data 66, or extract data items by applying schema 68 on the events.

For example, the schema 68 may be late-binding to cause the edge devices 12 to extract data fields from raw data of the time-indexed events to obtain the data items (e.g., the data items are extracted after indexing the events). In another example, the local instructions 18 can cause the edge devices 12 to implement the schema 68 to obtain data items by extracting data fields from raw data while the events are being indexed by timestamps (e.g., not after indexing the events). Any combination of the raw data 66 or data derived from the raw data 66 such as the events, the data items, or indicia thereof 70 can constitute results 70 generated by the edge devices 12. For example, the indicia constituting the results 70 may include an aggregate or summary of the events or the data items. The results 70 can be used to perform local actions 72 at the edge devices 12. For example, a local action can include changing an operational parameter of an edge device or changing a setting controlled by the edge device.

In some embodiments, only a small portion of the results 70 (e.g., 10%) is sent by the edge devices 12 to the server computer system 14 over a network. In some embodiments, the portion can be specified prior to commencing an operation by the edge devices 12 to create the time-indexed events. In some embodiments, the portion is determined during the operation (i.e., on the fly).

The server computer system 14 collects the results 70 or portion thereof sent by the edge devices 12 over the network. The results 70 or portion thereof obtained by the server computer system 14 collectively constitutes global results 74. In some embodiments, the server computer system 14 can implement data intake and query processes to create global time-indexed events ("global events") including segments of the global results 74. For example, the server computer system 14 may implement a schema 76 to extract data items from the global events while or after the global events are indexed. As such, the server computer system 14 may produce global data items.

The server computer system 14 includes instruction algorithms 20 that process the global results 74 or related data (e.g., global data items) to generate global instructions 22. Hence, the global instructions 22 are based on edge data generated by the network of distributed edge devices 12.

The server computer system 14 can then send an instance of the global instructions 22 or related data to one or more of the edge devices 12. The instance of the global instructions 22 or the related data can cause the edge device 12 to update its local instructions 18. In particular, the edge device 12 can use the global instructions 22 or related data to replace or modify its local instructions 18, which is used on subsequently generated raw data.

As such, the local instructions 18 of the edge devices 12 can be iteratively updated via the server computer system 14. By locally using at each edge device 12 the local instructions 18 that have been updated from data generated by itself and other edge devices 12, the system 10 can improve the performance of each of the edge devices 12 based on the data acquired by the network of distributed edge devices 12.

4.1.2 Machine Learning

FIG. 8 is a block diagram illustrating an operation of an embodiment of the system to improve analytics for the edge devices 12 similar to FIG. 7, but which can implement machine learning at the edge devices 12 or the server computer system 14. In the illustrated embodiment, the edge devices 12 or the server computer 14 can separately or collectively implement one of more machine learning processes 78. In general, a machine learning process 78-1 through 78-3 each involve an algorithm that can learn from and make predictions, classifications or identifications, etc. on data, rather than following a static set of program instructions.

Such algorithms operate by building a model from data. For example, the machine learning processes 78 can train models used to improve the local instructions 18 or global instructions 22.

Common machine learning algorithms generally involve either supervised or unsupervised learning. In supervised learning, a computer is presented with example inputs and desired outputs, with the goal of learning a rule that maps the inputs to the outputs. Unsupervised learning leaves the learning algorithm to find structure in the input without labeling the inputs or outputs. A learning algorithm can continuously learn from new inputs (e.g., training data) to improve predictions. There are various types and variations of machine learning processes known to persons skilled in the art that can be implemented in the disclosed embodiments and, as such, are not discussed herein for the sake of brevity.

Specifically, the machine learning processes 78-1 and 78-2 of the edge devices 12-1 and 12-2, respectively, can be used to improve the local instructions 18 based on the raw data 66, or the received global instructions 22 (or related data). Likewise, the machine learning processes 78-3 of the server computer system 14 can improve the global instructions 22 based on the global results 74 or data derived therefrom. Hence, the global instructions 22 can be generated in accordance with the machine learning process 78-3, and the server computer system 14 can push the machine-learned global instructions 22 (or related data) to the edge devices 12 to further improve their performance.

Moreover, when the edge devices 12 are disconnected from the server computer system 14, the disconnected edge devices 12 can still improve and update their local instructions 18 by learning from the raw data 66 without communicating with the server computer system 14.

4.2 Operation of Edge Device

FIG. 9 is an operation flow diagram illustrating an example of an operation flow 900 of an edge device according to an embodiment. In step 902, the edge device generates raw data based on inputs to the edge device. As part of its data intake and query processes, the edge device can execute local instructions on the vast amounts of raw data. For example, in step 904, the local instructions can cause the edge device to generate events indexed by timestamps. The events can include respective segments of the raw data generated by the edge device.

In step 906, the edge device can implement one or more operations to retrieve data from the events in accordance with the local instructions. For example, in step 908, the edge device can implement a schema to extract data items from the events. The schema may be late-binding to obtain data items from segments of the raw data in the events after the events are indexed. In another example, data items can be extracted from the raw data while the events are being indexed.

In step 910, the local instructions can cause the edge device to obtain results including any combination or portion of the raw data or data derived from the raw data (e.g., the data items). For example, the results may include at least a portion of the data items that have been aggregated to summarize the data items. In step 912, the edge device can execute a local action based on the results. For example, the local action can include changing an operational parameter of the edge device or changing a setting controlled by the edge device.

In step 914, the edge device determines whether it can connect to the server computer system over the network. If so, for example, the edge device may automatically and autonomously (e.g., without human interaction) establish machine-to-machine (M2M) communications with the server computer system to send the results or indicia thereof to the server computer system.

In step 916, if the edge device is communicatively connected to the server computer system, the edge device can send the results or indicia thereof over the network to the server computer system. In some embodiments, the results sent to the server computer system can include only a portion of the results obtained by performing the retrieval operation on the events in accordance with the local instructions.

In step 918, the edge device receives new instructions or related data from the server computer system over the network. The new instructions can be generated by the server computer system based on the results it received in step 916. In some embodiments, the new instructions were derived by the server computer system based on (global) results collected from the network of distributed edge devices, in addition to the results received in step 916 from the edge device.

The new (global) instructions or related data cause the edge device to update its local instructions. In particular, the edge device can use the new (global) instructions or related data to replace or modify its current local instructions. The operation of the edge device then returns to step 906 to perform operations using the new (global) instructions to retrieve new data items from the same events or create new events and extract new data items. As such, the local instructions of the edge device can be iteratively modified via the server computer system to improve edge analytics.

In some embodiments, if the edge device is disconnected from the server computer system, the edge device can take steps to locally update its local instructions. For example, in steps 920 and 922, the edge device can generate new instructions by performing machine learning processes on the raw data, the results data, the new global instructions, etc. The locally modified (and machine-learned) instructions can cause the edge device to perform operations on events to obtain new results in accordance with the locally modified local instructions. Further, the edge device can perform local actions based on the new results.

4.3 Server Computer System Operations

FIG. 10 is an operation flow diagram illustrating an example of an operation flow 1000 of a server computer system according to an embodiment. As discussed above, the server computer system can be intermittently communicatively connected to some edge devices and disconnected from other edge devices, all collectively forming a network of distributed edge devices.

In step 1002, the server computer system can collect global data from the network of distributed edge devices communicatively connected to the server computer system over the network. In some embodiments, the global data (e.g., global results) corresponds to the results generated by each of the edge devices in accordance with local instructions.

As part of its data intake and query processes, in step 1004, the server computer system may generate global events indexed by timestamps. The global events may include segments of the global data collected from the network of distributed edge devices.

In step 1006, the server computer system may implement schema to extract a data field from each of the global events to obtain global data items. For example, the server computer system may implement a late-binding schema that extracts global data items after the global events are indexed. In another example, the server computer may implement a schema that extracts data items while the global results are being indexed as timestamped events.

In steps 1008 and 1010, the server computer system may generate global instructions based on the global events or the global data items. Specifically, in step 1008, the server computer system may implement machine learning processes on the global events or the global data items to obtain the global instructions.

In step 1012, the server computer system sends the global instructions or related data to at least one of the network of distributed edge devices. The global instructions or the related data are configured to cause an edge device to update its local instructions. As such, the network of distributed edge devices can use the global instructions or related data to replace or modify their local instructions.

5.0 Computing System Architecture

Figure 11:
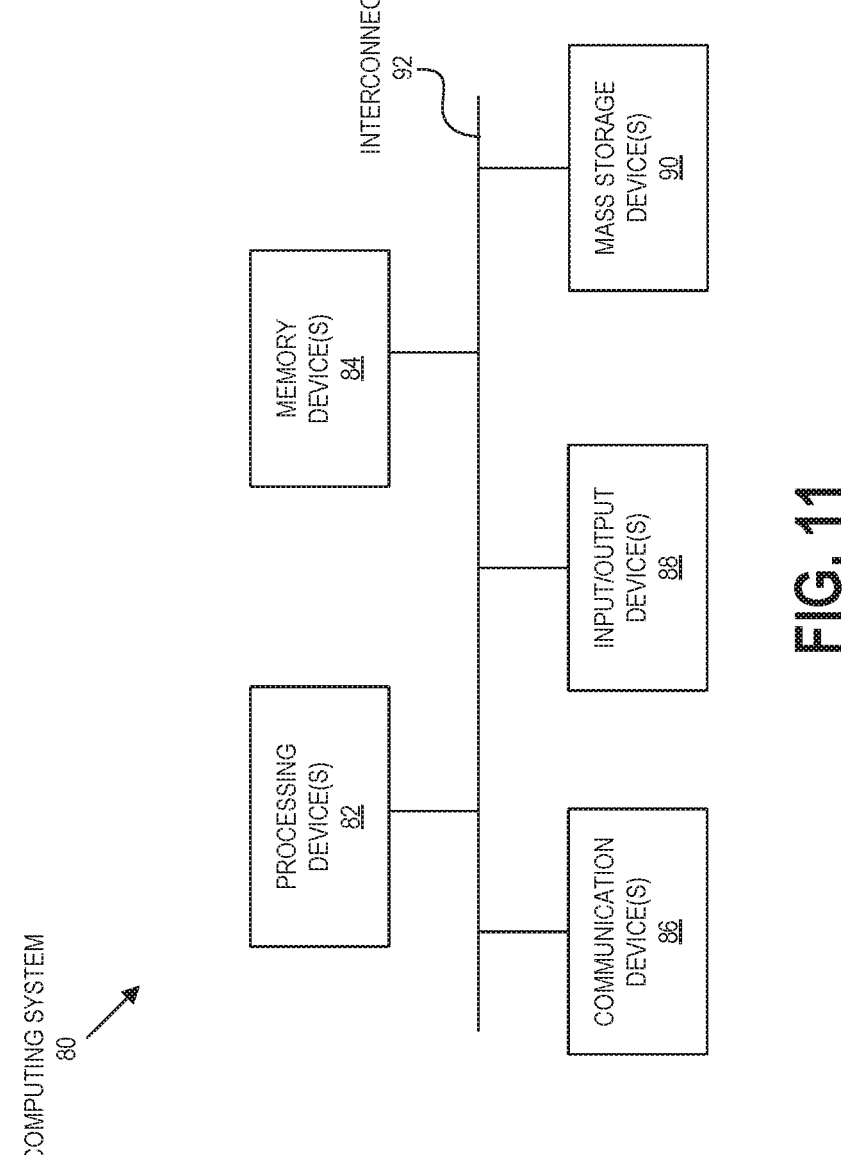
FIG. 11 is a block diagram illustrating a high-level example of a hardware architecture of a computing system that can be used to implement any one or more of the functional components described herein.

FIG. 11 is a block diagram illustrating a high-level example of a hardware architecture of a computing system 80 that can be used to implement any one or more of the functional components described herein (e.g., forwarder, indexer, search head, and data store, server computer system, edge device). In some embodiments, one or multiple instances of the computing system 80 can be used to implement the techniques described herein, where multiple such instances can be coupled to each other via one or more networks.

The illustrated computing system 80 includes one or more processing devices 82, one or more memory devices 84, one or more communication devices 86, one or more input/output (I/O) devices 88, and one or more mass storage devices 90, all coupled to each other through an interconnect 92. The interconnect 92 may be or include one or more conductive traces, buses, point-to-point connections, controllers, adapters, or other conventional connection devices. Each of the processing devices 82 controls, at least in part, the overall operation of the processing of the computing system 80 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 84 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 90 can be or include one or more hard drives, digital versatile disks (DVDs), flash memories, or the like. Each memory device 84 or mass storage device 90 can store (individually or collectively) data and instructions that configure the processing device(s) 82 to execute operations to implement the techniques described above.

Each communication device 86 may be or include, for example, an Ethernet adapter, cable modem, Wi-Fi adapter, cellular transceiver, baseband processor, Bluetooth or Bluetooth Low Energy (BLE) transceiver, serial communication device, or the like, or a combination thereof. Depending on the specific nature and purpose of the processing devices 82, each I/O device 88 can be or include a device such as a display (which may be a touch screen display), audio speaker, keyboard, mouse or other pointing device, microphone, camera, etc. Note, however, that such I/O devices 88 may be unnecessary if the processing device 82 is embodied solely as a server computer.

In the case of a client device (e.g., edge device), the communication devices(s) 86 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 86 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 84). A processor (e.g., processing device(s) 82) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 82), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 84).

6.0 Intelligent Throttling Embodiment

In some embodiments, it may be advantageous to push as much computation and processing of observed, received or ingested data to edge devices as possible, and away from a remote server computer system, in order to use local compute resources and reduce transmission of data. Performing computation on ingested data at an edge device enables the edge device to intelligently throttle the amount of information transmitted to the remote server computer system 14 (referred to below as "ingested data" for purposes of clarity). As each edge device 12 of a plurality of edge devices communicatively coupled to a server computer system ingests large amounts of data, transmission of the entirety of the ingested data requires vast amounts of resources and is often rather costly. Further, reliable connectivity between an edge device 12 and the server computer system 14 is not always guaranteed.

However, performing processing of the ingested data at the edge device 12 according to one or more predetermined rule sets enables the edge device 12 to determine whether the ingested data is "high-frequency, low-value data" or "high-value data." The transmission of high-frequency, low-value data to the server computer system 14 wastes valuable resources. Thus, performing processing of ingested data at an edge device 12 enables the system 10 to preserve resources and improve efficiency of the system as a whole by intelligently throttling data transmission. Further, processing of the ingested data enables the edge device 12 to discard the high-frequency, low-value data in some embodiments.

During processing of the ingested data according to a first rule set, the edge device 12 may generate a summary at periodic time intervals and transmit the summary to the server computer system 14, which may further analyze the summary (e.g., in accordance with one or more models taking into account historic data). Additionally, the edge device 12 may determine the ingested data is nearing a threshold, or will in the future, and such information should be transmitted to the server computer system 14 through the generation of an alert. In some embodiments, a summary may include information pertaining to analyses performed by the client applications 42, ingested data in a compressed format, a representative subset of the data ingested within a given time period, or other metrics or indicia of the ingested data (averages of metrics obtained, maximums, minimums, etc.). Thus, the summary provides the server computer system 14 with information summarizing the ingested data over a given time period such that the server computer system 14 may perform correlations, machine learning modeling or other operations based on the summary without the requirement to transmit the entirety of the ingested data.

In response to either determining the information in the summary is likely to exceed a threshold in the future or receiving an alert from an edge device 12, the server computer system 14 may transmit a communication to the edge device 12. The communication may include an instruction to enable a second rule set also stored on the edge device 12, and optionally disable the first rule set, wherein the second rule set includes alternative or modified rules for processing, storing or transmitting the ingested data to the server computer system 14. In one exemplary embodiment, the second rule set includes instructions for processing subsequent data, which may include the transmission of all subsequent data from the edge device 12 to the server computer system 14. The term "subsequent data" may refer to data ingested concurrently or after receiving the communication including the instruction to enable the second rule set.

6.1 Operation of Edge Device

FIG. 12 is a block diagram illustrating components of an edge device connected to a server computer system similar to FIG. 6, and further including components configured to implement an intelligent throttling embodiment according to one embodiment. In the illustrated embodiment, the system 1200 includes the edge device 12 and the server computer system 14. The edge device 12 includes the components as discussed above with respect to FIG. 6, and in addition, includes a rule set storage 1202 that has stored thereon one or more rule sets $1204_1$-$1204_i$, wherein ($i \geq 1$). The one or more rule sets $1204_1$-$1204_i$, when executed, instruct the client applications 42 to perform varying levels of processing with each level including varying operations or thresholds utilized during the processing. For example, the first rule set $1204_1$, when executed, may cause the client applications 42 to generate, and search, time series data by way of indexing, storing, searching, or extracting raw data or data items from the ingested data (e.g., raw data). In some embodiments, the first rule set $1204_1$, when executed, may cause the client applications 42 to perform a statistical analysis and generate a predicted status of the edge device 12, or a portion thereof, based on extrapolating the results of the statistical analysis. The first rule set $1204_1$, when executed, may then cause the client applications 42 to determine whether the predicted status exceeds a threshold, e.g., for a particular metric, within a given time period. An alert may be transmitted to the server computer system 14 based on a result of the determination.

The second rule set $1204_2$, when executed, may cause the client applications 42 to store a copy of all ingested data, or, in other embodiments, may cause the client applications 42 to transmit the ingested data, or a specified portion thereof, to the server computer system 14 for further analysis. In alternative embodiments, the second rule set $1204_2$, when executed, may cause the client applications 42 to generate, or search, time series data.

In one embodiment, the edge device 12 may include a first rule set $1204_1$ and second rule set $1204_2$ stored in the rule set storage 1202 and be configured such that the first rule set $1204_1$ is enabled and the second rule set $1204_2$ is disabled via default settings. In such an embodiment, the SPLUNK applications 46 or the SPLUNKD daemon 44 utilize the enabled rule set (or enabled rule sets) while processing the data ingested from the sensors 40 (wherein the ingested data may also be referred to as input).

As discussed above with respect to FIG. 6, the client applications 42 may include a SPLUNKD daemon 44, which operates as a background process that performs various operations without direct interaction from another device or a user. Additionally, the edge device 12 may host or execute one or more SPLUNK applications 46, which may enable, manage, or control operations of the edge device 12 in accordance with the local instructions 18. Further, one or more of the client applications 42 may execute one or more of the rule sets $1204_1$-$1204_i$. The edge device 12 may be preconfigured with one or more of the rule sets $1204_1$-$1204_i$ stored in the rule set storage 1202. In some embodiments, one or more of the rule sets $1204_1$-$1204_i$ may be received from the server computer system 14 via network connectivity or by manual transmission from another electronic device or storage device, not shown.

In one embodiment, execution of the first rule set $1204_1$ may cause processing of a particular metric that is extracted from ingested data with the processing including performance of a statistical analysis on the metric. In some embodiments, the statistical analysis may be a regression analysis, such as linear or nonlinear regression. Subsequently, based on the statistical analysis, the client applications 42 may extrapolate values of the metric to determine a prediction of the metric extending into the future (i.e., inferring likely values of the metric in the future). The extrapolation may be linear, polynomial, conic or French curve. Further, the client applications 42 may determine whether the extrapolated values are projected to exceed a threshold within a predefined time period. In other embodiments, the client applications 42 may determine whether trends or patterns observed in the input indicate a change in the status or the condition of the edge device. For example, in one embodiment, ingested data may be saved for a predefined time period (e.g., two days, one week, etc.) the client applications 42 may analyze the saved data to determine trends on a per metric based. In some instances, the term "trend" may be understood as an average value, or value range, of a particular metric during a particular, reoccurring time period (e.g., an average range for the temperature of a CPU during a particular time of day). Further, in one embodiment, execution of the first rule set $1204_1$ may cause processing of a metric including the determination as to whether the current metric value fits a trend (e.g., is within the established average range for the metric during the day of time, is within a tolerance level (e.g., percentage) of the average metric value), etc.). In other embodiments, the trends may be provided manually or from the server computer system 14. In response to determining the extrapolated values are projected to exceed the threshold within the time period, the client applications 42 may generate and cause the transmission of an alert to the server computer system 14 according to the enabled first rule set $1204_1$.

As will be discussed below, the server computer system 14 receives the alert from the edge device 12 and performs one or more analyses thereon. During the analyses, the server computer system 14 determines whether an action or operation needs to be taken based on the data ingested by the edge device 12. For example, the results of the analyses performed by the server computer system 14 may corroborate the results of the statistical analysis and extrapolation performed by the edge device 12.

In response to the alert or corroborating the results of the statistical analysis and extrapolation performed by the edge device 12, the server computer system 14 may transmit a communication to the edge device 12. The communication, e.g., a "rule set communication" as seen in FIG. 12, may include one or more instructions that when executed by the edge device 12, enable a second rule set $1204_2$ that was previously disabled. Further, execution of the one or more instructions may prompt the client applications 42 to utilize the second rule set $1204_2$ when processing ingested data. In some embodiments, the configuration manager 54 may receive, parse and interpret the rule set communications. The configuration manager 54 may then provide the instructions contained therein to the client applications 42. As discussed above, the rule set communication received from the server computer system 14 may include an instruction to disable the first rule set and enable the second rule set $1204_2$. In other embodiments, the rule set communication may include an instruction to enable the second rule set $1204_2$ and process ingested data with both the first rule set $1204_1$ and the second rule set $1204_2$, serially or in parallel. In one example, when the first rule set $1204_1$ and the second rule set $1204_2$ are to be performed serially, the results of execution of the first rule set $1204_1$ may be processed by executing the second rule set $1204_2$. In another example, when the first rule set $1204_1$ and the second rule set $1204_2$ are to be performed in parallel, execution of one of the first rule set $1204_1$ or the second rule set $1204_2$ may be performed on a copy of the ingested data such that execution is performed concurrently (at least partially overlapping in time).

In some embodiments, the second rule set $1204_2$ may include instructions to pass all ingested data to the server computer system 14 for processing. Additionally, or in the alternative, the second rule set $1204_2$ may include instructions store a copy of all ingested data. In addition, the second rule set $1204_2$ may include instructions for performing analyses similar to those discussed above but need not be so limited. In some embodiments, the second rule set $1204_2$ may include thresholds that differ from those implemented in the first rule set $1204_1$.

6.1.1 Limited or No Connectivity Available Between Server Computer System and Edge Device It should also be noted that in some embodiments, the connection between the server computer system 14 and the edge device 12 may be limited or completely lacking. In such a scenario, the edge device 12 may still perform processing of ingested data according to the first rule set $1204_1$ as discussed above. However, when the client applications 42 determine an alert is to be transmitted to the server computer system 14 and no connection is available (or a limited connection precludes transmission), the first rule set $1204_1$ may include instructions to automatically enable the second rule set $1204_2$. Alternatively, or in addition, a third rule set, e.g., rule set $1204_3$, may automatically be enabled that includes instructions to store all ingested data. In some embodiments, the second rule set $1204_2$ or third rule set $1204_3$ may be implemented in parallel on a copy of the ingested data.

6.2 Operation of Server Computer System

In addition to the server computer system 14 sending pipelined search language queries and global instructions 22 or related data to the edge device 12, the server computer system 14 may transmit communications pertaining to one or more rule sets stored on the edge device 12. In some embodiments, such communications pertaining to the one or more rule sets may be in response to the receipt of an alert or a summary from the edge device 12.

More specifically, upon receipt of either an alert or a summary, the server computer system 14 may perform analyses on the information included therein. For instance, the server computer system 14 may perform analyses on information included in the alert or the summary, wherein the analyses may incorporate historical data (i.e., previously received summaries for the edge device, or similar edge devices, or machine learning models based on previously ingested data) and determine whether data expected to be ingested within a predetermined time period exceeds a threshold. Based on the result of the analyses, the server computer system 14 may transmit a communication to the edge device 12 that includes the instruction to enable the second rule set.

However, in other embodiments, e.g., when an alert is received, the server computer system 14 may automatically transmit a communication to the edge device 14 including an instruction to enable a second rule set, which may prompt the edge device 14 to transmit all ingested data to the server computer system 14 for additional analyses. It should be noted that in some embodiments, the communication transmitted to the edge device 12 may include an updated rule set (or a partial rule set that includes one or more updated rules).

In some embodiments, the server computer system 14 may perform an analysis of information included in a summary or an alert in combination with historical data or contextual data. For instance, in some embodiments, the server computer system 14 may utilize a machine learning model (also referred to as a "model") that takes one or more metrics included in the summary or alert as input to generate a prediction as to whether the edge device 12 will satisfy a particular condition in the future (e.g., input to be received is predicted to exceed a threshold, such as liquid overflowing a tank, the temperature of a device will continue to increase too rapidly or exceed a specified threshold, etc.). In some examples, a model may be generated for each type of sensor providing input to any edge device 12 communicatively coupled to the computer server system 14. Additionally, a model may be generated using historical data generated by a sensor or multiple sensors (e.g., within a geographic in some embodiments).

In addition, or in the alternative, the server computer system 14 may apply a set of rules (e.g., a runbook, or at times referred to as a playbook) to the information included in the summary or alert, which may include determining whether input from multiple sensors each exceed predetermined thresholds or input from a sensor is changing at a pace that exceeds a predetermined threshold. Furthermore, the server computer system 14 may utilize contextual data in the analyses of the information within the summary or alert. As will be discussed in the examples below, the server computer system 14 may utilize contextual data in its analyses. Examples of contextual data include, but are not limited or restricted to, temperature, weather data, power outages/brown outs, traffic data, input from other edge devices or sensors, a time of day, week or year, etc.

It should be noted that in some embodiments, the client applications 42 on the edge device 12 may incorporate contextual data while processing and analyzing ingested data. In some embodiments, the use of contextual data by the client applications 42 comprises a lightweight utilization as compared to the use by the server computer system 14 (i.e., fewer rules or computations involving contextual data). The use of contextual data by the client applications 42 of the edge device 12 may include correlation of ingested data among multiple sensors (e.g., a thermocouple and a thermostat) or among multiple edge devices or correlation of ingested data and notifications from the computer server system 14, such as regarding to weather or power outages, brown-outs, etc.

6.3 Exemplary Embodiments of Intelligent Throttling Operations

In many situations, pushing processing to the edge device 12 to limit, e.g., "throttle," the amount of data that is transmitted to the server computer system 14 is highly advantageous. For instance, edge devices 12 may operate in locations remote from the server computer system 14 such that connectivity issues complicate the transmission of large amounts of data. Additionally, as edge devices 12 become extremely ubiquitous and the amount of data obtained by sensors coupled to the edge devices continues to increase exponentially, the resources required to transmit that data to the server computer system 14 and process that data at a centralized location also increase exponentially; thus, increasing costs. Instead, by pushing a subset of the processing to the edge device 12 and using local resources to determine a health status of the edge device 12 or a predicted health status for example, the system 10 may intelligently throttle the amount of data transmitted to and processed by the server computer system 14 by sending summaries or alerts as discussed above as opposed to the ingested data in its entirety.

6.3.1 Cell Tower Status Indication

Figure 13A:
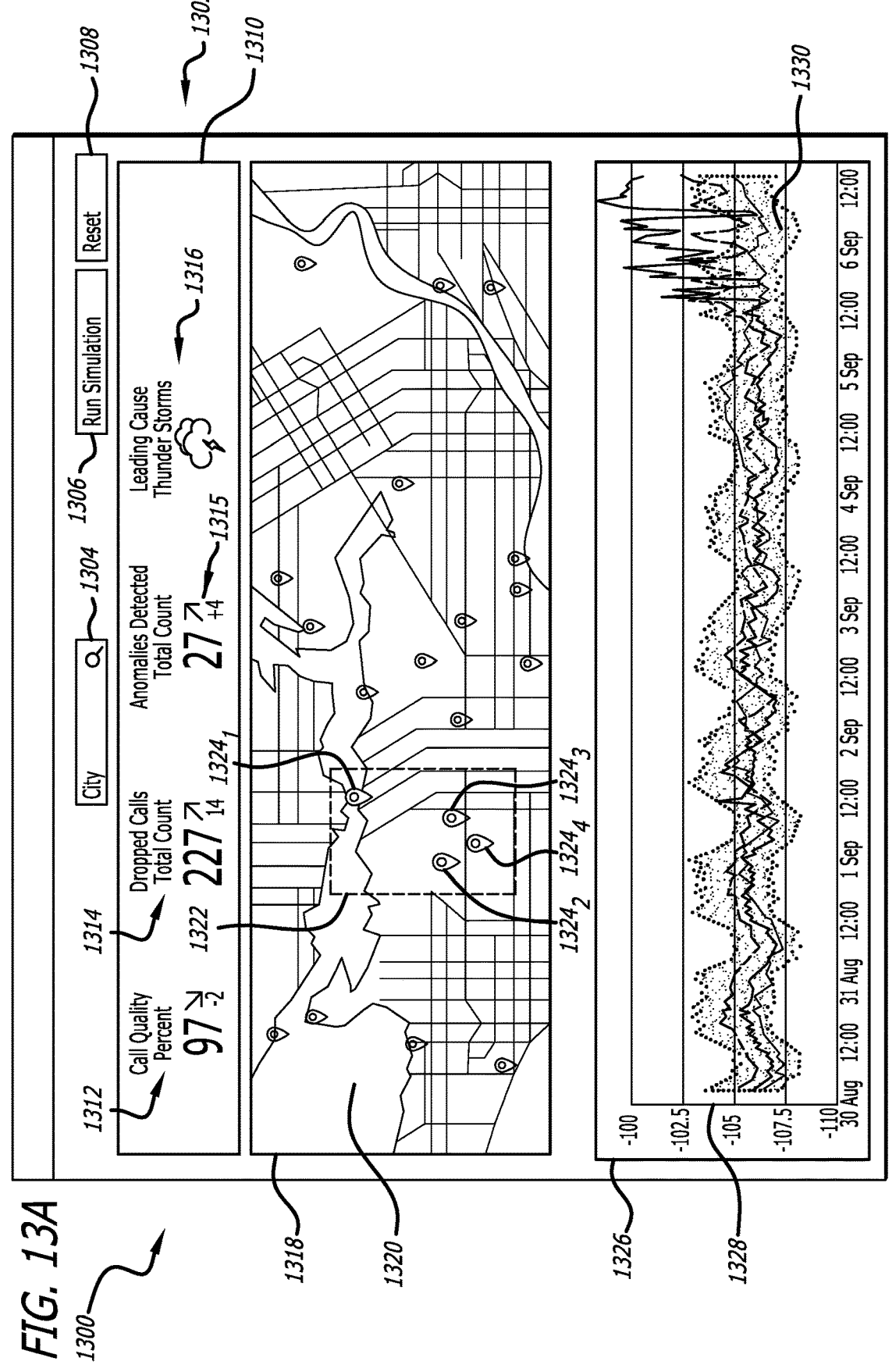
FIG. 13A is an exemplary interactive user interface displaying data conveying states of a plurality of edge devices within a geographic region.

Referring now to FIG. 13A, an exemplary interactive user interface displaying data conveying states of a plurality of edge devices within a geographic region is shown in accordance with some embodiments. Specifically, FIG. 13A includes an interactive user interface (UI) 1300 that displays data pertaining to metrics of a plurality of cell towers. Illustrated in the interactive UI 1300 is a home screen 1302 that includes a plurality of display screens 1310, 1318 and 1326. Additionally, a search bar 1304 is shown providing a user an input method for searching for a desired geographic region, e.g., a city, in order to run a simulation of cell tower metrics within or near the desired city. Example metrics include, but are not limited or restricted to, call quality, dropped calls, and anomalies detected and weather (predicted or current). The computation resulting in the data illustrated in FIGS. 13A-13B may be initiated by activating the "Run Simulation" button 1306. In the embodiment of FIG. 13A, the display screen 1310 includes a listing of a leading cause for the metrics, which in the illustrated embodiment, is listed as thunderstorms. The "Reset" button 1308 allows a user to clear the display screens and any entered search criteria.

The display screen 1310 provides a visual display of metrics including call quality 1312, dropped calls 1314, anomalies detected 1315, and a leading cause of the metrics 1316. The display screen 1318 illustrates a map 1320 of a desired city, e.g., Vancouver, and icons 1324₁-1324ⱼ; (wherein j=4 in this embodiment). In particular, the metrics displayed in the interactive UI 1300 may pertain to the cell towers located within a specified region 1322.

The display screen 1326 illustrates a graphical representation 1328 of the metrics of the cell towers within the geographic region 1322 over time. The data 1330 provides an indication as to the expected or modeled metrics of those cell towers (e.g., dotted region) and the actual metrics of the cell towers (e.g., solid or dashed lines). In some embodiments, the modeled metrics may take into account effects of the weather (e.g., contextual data). In other embodiments, the weather may not include the weather into the modeling (i.e., the expected metrics) but instead determine that the likely root cause of the actual metrics being anomalous is the presence of thunderstorms in the area. Furthermore, the graphic representation 1328 may include modeling of metrics in the future (e.g., hours or days in the future) thereby providing the user with an idea of how the expected weather will affect the metrics of the cell towers within the specified region 1322.

Figure 13B:
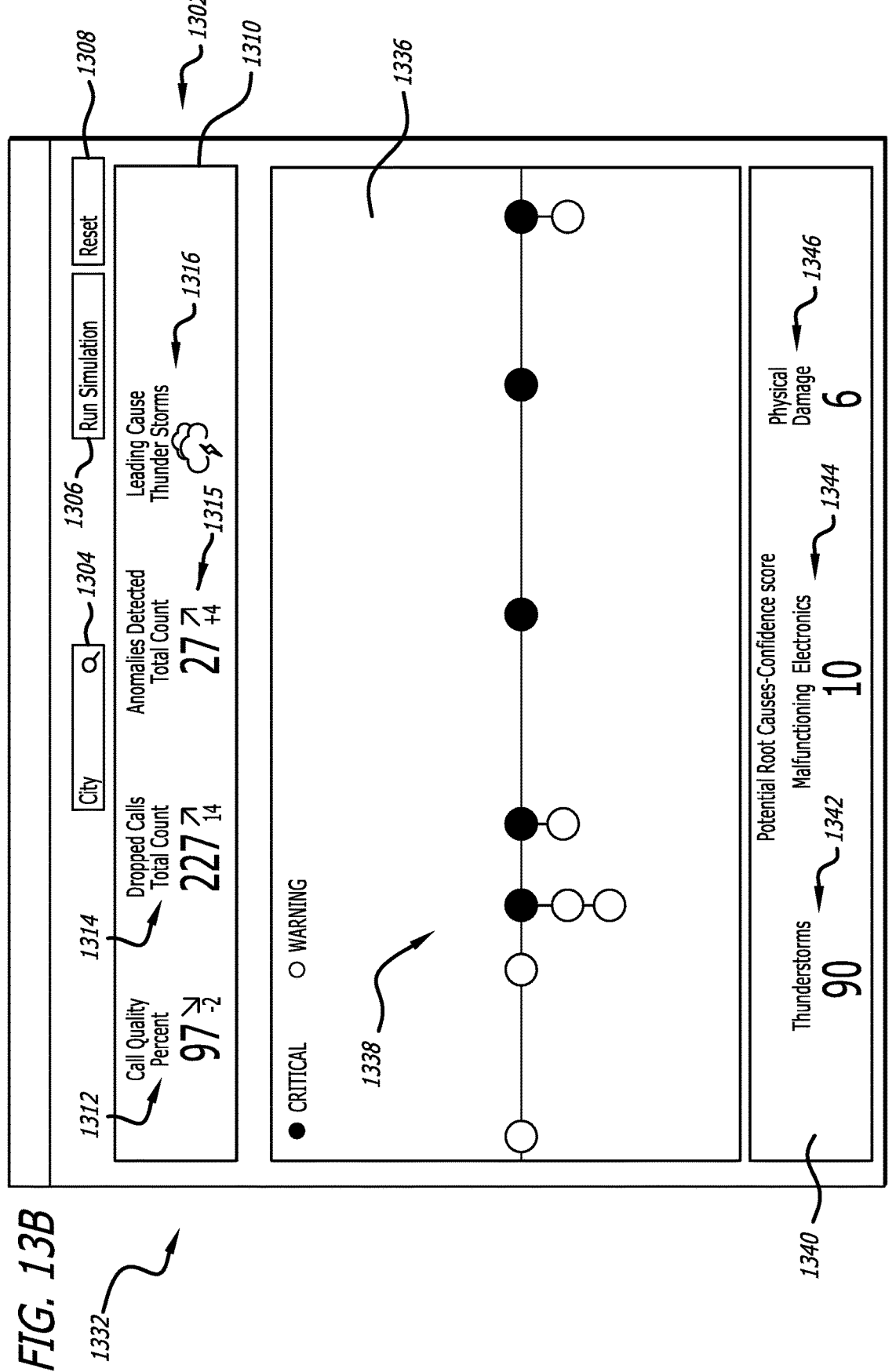
FIG. 13B is a second exemplary interactive user interface displaying data conveying states of a plurality of edge devices within a geographic region.

Referring now to FIG. 13B, a second exemplary interactive user interface displaying data conveying states of a plurality of edge devices within a geographic region is shown in accordance with some embodiments. Specifically, FIG. 13B includes an interactive UI 1332 that displays data pertaining to metrics of the plurality of cell towers as illustrated in FIG. 13A. Illustrated in the interactive UI 1332 is the home screen 1302 that includes a plurality of display screens 1310, 1336 and 1340. The display screen 1336 includes a graphical representation of icons that indicate a current or projected status of a plurality of cell towers. For example, a first icon (e.g., a white icon) may indicate a cell tower's status is "warning" while a second icon (e.g., a shaded icon) may indicate a cell tower's status is "critical." It should be understood that numerous statuses other than "warning" and "critical" are within the scope of the invention as are various other visual indicators, including, for example, "healthy."

In some embodiments, user input corresponding to hovering over (e.g., with a mouse) of an icon or a prolonged touch input to an icon via a screen of an applicable electronic device may provide additional information about the corresponding cell tower. For example, hovering over an icon may cause a display of a cell tower identifier (ID) and metrics for the cell tower (e.g., number of dropped calls, anomaly (signal interference), and a potential root cause of the metric values). Further, selecting the icon (e.g., clicking on the icon) may cause a display of a cell tower detail screen, not shown.

In some embodiments, the display screen 1340 may be included and illustrate a listing of potential root causes 1342 (e.g., thunderstorms), 1344 (e.g., malfunctioning electronics of an edge device/sensor) and 1346 (e.g., physical damage to an edge device/sensor). A corresponding confidence score may also be provided along with the listing of each potential root cause. The confidence score may be determined by a weighted analysis of the metrics (wherein each metric corresponds to a predetermined weight).

6.3.2 Security Monitoring Embodiment

In addition to the discussion above with respect to FIGS. 13A-13B detailing one embodiment of how pushing processing to an edge device ("intelligent throttling") may be implemented to improve IT Operations Analytics (ITOA), intelligent throttling may also be implemented to improve edge device security monitoring. As one example, a software agent (e.g., logic) may be stored and operate on an endpoint (e.g., such as the edge device 12). The endpoint may be communicatively coupled to a computer server system, such as the computer server system 14. The agent may be configured with security rules that monitor networking traffic or processing of the endpoint device. For instance, the agent may perform a static analysis on received data such as network traffic (e.g., HTTP traffic, email messages, etc.) received via a SPLUNK HTTP Event Collector (HEC). The static analysis may include comparisons of the received network traffic with white lists or black lists that detail non-malicious and malicious objects, respectively. The term "object" when used in relation to the security monitoring embodiment may generally refer to a collection of data, whether in transit (e.g., over a network) or at rest (e.g., stored), often having a logical structure or organization that enables it to be categorized or typed for purposes of analysis. The static analysis may also include a rules-based analysis.

Based on the analysis performed by the agent at the endpoint device, the agent may detect malware or an infection. The term "malware" may be understood to generally refer to code or activity that initiates a malicious attack or operations associated with anomalous or unwanted behavior. For example, the agent may detect a URL link in an email that appears on a blacklist (e.g., a known malicious URL). Alternatively, the agent may detect a file that was received in an email from an email address appearing on a blacklist. It should be understood that malware detection is not limited to these examples and the disclosure is not intended to be so limited.

Upon detecting the infection or malware, the agent may transmit a summary or alert to the server computer system 14, which may process a runbook (e.g., at least a composition of a set of rules) that causes transmission of a series of updated analyses or remediation rules to the agent. In response to receiving the series of updated analyses or remediation rules, the agent executes an attempt to halt the malware attack or spread thereof within the endpoint or to other endpoints. In some instances, the received data may be time series data. In other instances, the received data need not be time series data. Further, in some instances, the computer server system 14 may implement machine learning techniques in detecting malicious behaviors and in generating updated analyses or remediation rules.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence or in any combination, and (ii) the components of respective embodiments may be combined in any manner.

Although the subject matter has been described in language specific to structural features or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computerized method comprising:
obtaining, at a server computer system, correlated data from a plurality of edge devices,
wherein the correlated data includes ingested data that has undergone processing by at least a first edge device of the plurality of edge devices prior to transmission of the correlated data to the server computer system by the first edge device, and
wherein the processing comprises a correlation operation that includes an evaluation of relatedness between (i) data ingested by the first edge device and (ii) data ingested by a second edge device of the plurality of edge devices;
performing, by the server computer system, analyses of the correlated data from the plurality of edge devices, wherein the analyses include performing, by one or more processors of the server computer system, machine learning modeling on the correlated data from the plurality of edges, wherein the machine learning modeling results in a determination of predicted values for data expected to be ingested by the plurality of edge devices;
determining, by the server computer system, whether the predicted values for data expected to be ingested by the plurality of edge devices satisfies a threshold comparison for the plurality of edge devices; and
transmitting, by the server computer system, global instructions to the plurality of edge devices upon the predicted values satisfying the threshold comparison, wherein the global instructions are (i) generated based on the correlated data from the plurality of edge devices for use in determining local instructions to be updated through replacement or modification and (ii) configured to cause updating of the local instructions that are stored by and directed to controlling operations for indexing, storing, searching, or extracting raw data or data items from the raw data by each of the plurality of edge devices in response to the predicted values for data satisfying the threshold comparison,
wherein the local instructions are executable by one or more processors for each of the plurality of edge devices to perform the operations as part of data intake and query processes performed by each of the plurality of edge devices.

2. The computerized method of claim 1, wherein the machine learning modeling utilizes contextual data corresponding to one or more of the plurality of edge devices, wherein contextual data corresponding to a first edge device is data obtained by a device other than the first edge device.

3. The computerized method of claim 1, wherein performing the analyses of the correlated data is initiated by user input requesting performance of a simulation of future ingested data by at least a subset of the plurality of edge devices.

4. The computerized method of claim 1, wherein determining whether the predicted values satisfy the threshold comparison for the plurality of edge devices includes performing a comparison of the predicted values for the plurality of edge devices to one or more thresholds.

5. The computerized method of claim 4, further comprising:
based on results of comparing the predicted values to the one or more thresholds, transmitting a communication to one or more of the plurality of edge devices, wherein the communication includes instructions for performing analyses on subsequently ingested data or for transmitting the subsequently ingested data to a server computer system communicatively coupled to the plurality of edge devices.

6. The computerized method of claim 1, wherein performing machine learning modeling includes deployment of an individual trained machine learning model for each type of edge device include in the plurality of edge devices.

7. The computerized method of claim 6, wherein each individual trained machine learning model is trained using data obtained by a corresponding edge device.

8. A non-transitory computer readable storage medium having stored thereon instructions, the instructions being executable by one or more processors to perform operations comprising:
obtaining, at a server computer system, correlated data from a plurality of edge devices, wherein the correlated data includes ingested data that has undergone processing by a first edge device of the plurality of edge devices prior to transmission of the correlated data to the server computer system by the first edge device, and wherein the processing includes a correlation operation that includes an evaluation of relatedness between at least (i) data ingested by the first edge device and (ii) data ingested by a second edge device of the plurality of edge devices;

performing, by the server computer system, analyses of the correlated data from the plurality of edge devices, wherein the analyses include performing, by one or more processors of the server computer system, machine learning modeling on the correlated data from the plurality of edges, wherein the machine learning modeling results in a determination of predicted values for data expected to be ingested by the plurality of edge devices;

determining, by the server computer system, whether the predicted values for data expected to be ingested by the plurality of edge devices satisfies a threshold comparison for the plurality of edge devices; and transmitting, by the server computer system, global instructions to the plurality of edge devices upon the predicted values satisfying the threshold comparison, wherein the global instructions are (i) generated based on the correlated data from the plurality of edge devices for use in determining local instructions to be updated through replacement or modification and (ii) configured to cause updating of the local instructions that are stored by and directed to controlling operations for indexing, storing, searching, or extracting raw data or data items from the raw data by each of the plurality of edge devices, wherein the local instructions are executable by one or more processors deployed within each of the plurality of edge devices to perform the operations as part of data intake and query processes performed by each of the plurality of edge devices.

9. The non-transitory computer readable storage medium of claim 8, wherein the machine learning modeling utilizes contextual data corresponding to one or more of the plurality of edge devices, wherein contextual data corresponding to a first edge device is data obtained by a device other than the first edge device.

10. The non-transitory computer readable storage medium of claim 8, wherein performing the analyses of the correlated data is initiated by user input requesting performance of a simulation of future ingested data by at least a subset of the plurality of edge devices.

11. The non-transitory computer readable storage medium of claim 8, wherein determining whether the predicted values satisfy the threshold comparison for the plurality of edge devices includes performing a comparison of the predicted values for the plurality of edge devices to one or more thresholds.

12. The non-transitory computer readable storage medium of claim 11, the instructions being executable by the one or more processors to perform further operations comprising:

based on results of comparing the predicted values to the one or more thresholds, transmitting a communication to one or more of the plurality of edge devices, wherein the communication includes instructions for performing analyses on subsequently ingested data or for transmitting the subsequently ingested data to a server computer system communicatively coupled to the plurality of edge devices.

13. The non-transitory computer readable storage medium of claim 8, wherein performing machine learning modeling includes deployment of an individual trained machine learning model for each type of edge device include in the plurality of edge devices.

14. The non-transitory computer readable storage medium of claim 13, wherein each individual trained machine learning model is trained using data obtained by a corresponding edge device.

15. A system comprising:

a memory to store executable instructions; and a processing device coupled with the memory, wherein the instructions, when executed by the processing device, cause operations including:

obtaining, at a server computer system, correlated data from a plurality of edge devices, wherein the correlated data includes ingested data that has undergone processing by a first edge device of the plurality of edge devices prior to transmission of the correlated data to the server computer system by the first edge device, wherein the processing includes a correlation operation that includes an evaluation of relatedness between at least (i) data ingested by the first edge device and (ii) data ingested by a second edge device of the plurality of edge devices, and wherein the processing by the first edge device occurs prior to transmission of the correlated data to the server computer system by the first edge device;

performing, by the server computer system, analyses of the correlated data from the plurality of edge devices, wherein the analyses include performing, by one or more processors of the server computer system, machine learning modeling on the correlated data from the plurality of edges, wherein the machine learning modeling results in a determination of predicted values for data expected to be ingested by the plurality of edge devices;

determining, by the server computer system, whether the predicted values for data expected to be ingested by the plurality of edge devices satisfies a threshold comparison for the plurality of edge devices; and transmitting, by the server computer system, global instructions to the plurality of edge devices upon the predicted values satisfying the threshold comparison, wherein the global instructions are (i) generated based on the correlated data from the plurality of edge devices for use in determining local instructions to be updated through replacement or modification and (ii) configured to cause updating of the local instructions that are stored by and directed to controlling operations for indexing, storing, searching, or extracting raw data or data items from the raw data by each of the plurality of edge devices in response to the predicted values for data satisfying the threshold comparison, wherein the local instructions are executable by one or more processors for each of the plurality of edge devices to perform the operations as part of data intake and query processes performed by each of the plurality of edge devices.

16. The system of claim 15, wherein the machine learning modeling utilizes contextual data corresponding to one or more of the plurality of edge devices, wherein contextual data corresponding to a first edge device is data obtained by a device other than the first edge device.

17. The system of claim 15, wherein performing the analyses of the correlated data is initiated by user input requesting performance of a simulation of future ingested data by at least a subset of the plurality of edge devices.

18. The system of claim 15, wherein determining whether the predicted values satisfy the threshold comparison for the plurality of edge devices includes performing a comparison of the predicted values for the plurality of edge devices to one or more thresholds.

19. The system of claim 18, wherein the operations further comprising:

based on results of comparing the predicted values to the one or more thresholds, transmitting a communication to one or more of the plurality of edge devices, wherein the communication includes instructions for performing analyses on subsequently ingested data or for transmitting the subsequently ingested data to a server computer system communicatively coupled to the plurality of edge devices.

20. The system of claim 15, wherein performing machine learning modeling includes deployment of an individual trained machine learning model for each type of edge device include in the plurality of edge devices.

* * * * *